(12) United States Patent
Gao et al.

(10) Patent No.: US 9,674,748 B2
(45) Date of Patent: Jun. 6, 2017

(54) METHOD AND APPARATUS FOR NETWORK HANDOVER

(71) Applicant: Huawei Device Co., Ltd., Shenzhen (CN)

(72) Inventors: Chenliang Gao, Beijing (CN); Xiaoyan Duan, Beijing (CN); Qiang Yi, Beijing (CN); Hui Jin, Beijing (CN); Guiming Shu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 110 days.

(21) Appl. No.: 14/575,010

(22) Filed: Dec. 18, 2014

(65) Prior Publication Data

US 2015/0103804 A1 Apr. 16, 2015

Related U.S. Application Data

(63) Continuation of application No. PCT/CN2013/077962, filed on Jun. 26, 2013.

(30) Foreign Application Priority Data

Jun. 29, 2012 (CN) .......................... 2012 1 0222417

(51) Int. Cl.
*H04W 4/00* (2009.01)
*H04W 36/14* (2009.01)
(Continued)

(52) U.S. Cl.
CPC ......... *H04W 36/14* (2013.01); *H04W 76/025* (2013.01); *H04W 88/16* (2013.01)

(58) Field of Classification Search
None
See application file for complete search history.

(56) References Cited

U.S. PATENT DOCUMENTS

2011/0280215 A1 11/2011 Nakagawa et al.
2012/0014352 A1* 1/2012 Giaretta .............. H04W 76/021
370/331

FOREIGN PATENT DOCUMENTS

CN 101212461 A 7/2008
CN 101365228 A 2/2009
(Continued)

OTHER PUBLICATIONS

Foreign Communication From a Counterpart Application, European Application No. 13810567.1, Extended European Search Report dated Jun. 15, 2015, 9 pages.

(Continued)

*Primary Examiner* — Zewdu A Beyen
(74) *Attorney, Agent, or Firm* — Conley Rose, P.C.

(57) ABSTRACT

A method for network handover includes sending a first message that includes first information to a second network, where the first information is used to indicate that a user equipment needs to be handed over from a first network to the second network, so that a target gateway device allocates, to the user equipment according to at least the first information sent by the second network, a second Internet Protocol (IP) address that is the same as a first IP address and used when a second packet data network (PDN) connection is established by using the second network and the target gateway device, where the first IP address is an IP address used when the user equipment establishes a first PDN connection by using the first network and the target gateway device. Therefore, service continuity is ensured after a network handover.

20 Claims, 7 Drawing Sheets

(51) Int. Cl.
*H04W 76/02* (2009.01)
*H04W 88/16* (2009.01)

(56) References Cited

FOREIGN PATENT DOCUMENTS

| | | | |
|---|---|---|---|
| CN | 101553010 | A | 10/2009 |
| CN | 102123373 | A | 7/2011 |
| EP | 2071767 | A1 | 6/2009 |
| EP | 2863683 | A1 | 4/2015 |
| WO | 2010108770 | A2 | 9/2010 |

OTHER PUBLICATIONS

Partial English Translation and Abstract of Chinese Patent Application No. CN101212461A, Apr. 8, 2015, 8 pages.
Gundavelli, S., Ed., et al., "Proxy Mobile IPv6," RFC 5213, Aug. 2008, 92 pages.
Liu, G., et al., "HO from 3GPP to a trusted non-3GPP access," draft-liu-dhc-ho-01.txt, Mar. 6, 2012, 15 pages.
"3rd Generation Partnership Project; Technical Specification Group Services and System Aspects; Study on S2a Mobility based on GTP & WLAN access to EPC (SaMOG); Stage 2 (Release 12)," 3GPP TR 23.852, V1.1.0, May 2012, 41 pages.
Foreign Communication From a Counterpart Application, PCT Application No. PCT/CN2013/077962, English Translation of International Search Report dated Oct. 10, 2013, 2 pages.
Foreign Communication From a Counterpart Application, PCT Application No. PCT/CN2013/077962, English Translation of Written Opinion dated Oct. 10, 2013, 17 pages.
Droms, R., "Dynamic Host Configuration Protocol," RFC 2131, Mar. 1997, 45 pages.

\* cited by examiner

100

Send a first message including first information to a second network, where the first information is used to indicate that a user equipment needs to be handed over from a first network to the second network, so that a target gateway device allocates, to the user equipment according to at least the first information sent by the second network, a second IP address that is the same as a first IP address and used when a second packet data network PDN connection is established by using the second network and the target gateway device, where the first IP address is an IP address used when the user equipment establishes a first PDN connection by using the first network and the target gateway device

S110

Receive a fifth message sent by the second network, where the fifth message includes second information used for indicating the second IP address

S120

Determine the second IP address according to at least the second information

S130

Receive a first message that is sent by a user equipment and includes first information, where the first information is used to indicate that the user equipment needs to be handed over from a first network to a second network ⸺ S410

Send, according to at least the first information, a second message including the first information, so that a target gateway device allocates, to the user equipment according to at least the first information, a second IP address that is the same as a first IP address and used when a second packet data network PDN connection is established by using the second network and the target gateway device, where the first IP address is an IP address used when the user equipment establishes a first PDN connection by using the first network and the target gateway device ⸺ S420

Receive a second message that is sent by a second network and includes first information, where the second message is sent by the second network according to at least a first message that is sent by a user equipment and includes the first information, and the first information is used to indicate that the user equipment needs to be handed over from a first network to the second network — S510

Determine a first IP address according to at least the first information, where the first IP address is an IP address used when the user equipment establishes a first packet data network PDN connection by using the first network and a target gateway device — S520

Allocate a second IP address that is the same as the first IP address to the user equipment when the user equipment establishes a second PDN connection by using the second network — S530

FIG. 5

METHOD AND APPARATUS FOR NETWORK HANDOVER

CROSS-REFERENCE TO RELATED APPLICATIONS

This application is a continuation of International Application No. PCT/CN2013/077962, filed on Jun. 26, 2013, which claims priority to Chinese Patent Application No. 201210222417.3, filed on Jun. 29, 2012, both of which are incorporated herein by reference in their entireties.

TECHNICAL FIELD

The present invention relates to the field of communications, and in particular, to a method and an apparatus for network handover.

BACKGROUND

Currently, after a user equipment (UE) accesses an evolved packet core (EPC) network by using, for example, a 3rd Generation Partnership Project (3GPP) network, and establishes a packet data network (PDN) connection and obtains an Internet Protocol (IP) address (first IP address) through a packet data network gateway (PDN-GW) (first PDN-GW), if the UE accesses the EPC by using, for example, a trusted wireless local area network access network (TWAN), a home subscriber server or an authentication, authorization and accounting server (HSS/AAA) allocates a default access point name (APN) to the TWAN according to subscription information of the UE, so that when a PDN connection is established, the TWAN selects a PDN-GW (second PDN-GW) to establish the PDN connection, where the second PDN-GW uses the default APN to allocate an IP address (second IP address) to the UE.

However, in a case where the TWAN uses the default APN to establish the PDN connection, it cannot be ensured that the first PDN-GW used for establishing the PDN connection in the 3GPP network is the same as the second PDN-GW used for establishing the PDN connection in the TWAN, and even in a case where the first PDN-GW and the second PDN-GW are the same, it cannot be ensured that the second IP address and the first IP address are the same. Therefore, service continuity cannot be ensured.

SUMMARY

Embodiments of the present invention provide a method and an apparatus for network handover, which are capable of ensuring service continuity after a network handover.

According to one aspect, a method for network handover is provided, where the method includes sending a first message that includes first information to a second network, where the first information is used to indicate that a UE needs to be handed over from a first network to the second network, so that a target gateway device allocates, to the UE according to at least the first information sent by the second network, a second IP address that is the same as a first IP address and used when a second packet data network PDN connection is established by using the second network and the target gateway device, where the first IP address is an IP address used when the UE establishes a first PDN connection by using the first network and the target gateway device.

In a possible implementation manner, the method further includes receiving a fifth message that is sent by the second network and includes second information, where the second information is used to indicate the second IP address; and determining the second IP address according to at least the second information.

According to another aspect, a method for network handover is provided, where the method includes receiving a first message that is sent by a UE and includes first information, where the first information is used to indicate that the UE needs to be handed over from a first network to a second network; and sending, according to at least the first information, a second message that includes the first information, so that a target gateway device allocates, to the UE according to at least the first information, a second IP address that is the same as a first IP address and used when a second packet data network PDN connection is established by using the second network and the target gateway device, where the first IP address is an IP address used when the UE establishes a first PDN connection by using the first network and the target gateway device.

According to still another aspect, a method for network handover is provided, where the method includes receiving a second message that is sent by a second network and includes first information, where the first information is sent by the second network according to at least the first information sent by a UE, and is used to indicate that the UE needs to be handed over from a first network to the second network; determining a first IP address according to at least the first information, where the first IP address is an IP address used when the UE establishes a first packet data network PDN connection by using the first network and a target gateway device; and allocating a second IP address that is the same as the first IP address to the UE when the UE establishes a second PDN connection by using the second network.

In a possible implementation manner, the method further includes sending a sixth message that includes second information to the second network, where the second information is used to indicate the second IP address.

According to still another aspect, an apparatus for network handover is provided, where the apparatus includes a sending unit configured to send a first message that includes first information to a second network, where the first information is used to indicate that a UE needs to be handed over from a first network to the second network, so that a target gateway device allocates, to the UE according to at least the first information sent by the second network, a second IP address that is the same as a first IP address and used when a second packet data network PDN connection is established by using the second network and the target gateway device, where the first IP address is an IP address used when the UE establishes a first PDN connection by using the first network and the target gateway device.

In a possible implementation manner, the apparatus further includes a receiving unit configured to receive a fifth message that is sent by the second network and includes second information, where the second information is used to indicate the second IP address; and the processing unit further configured to determine the second IP address according to at least the second information.

According to still another aspect, an apparatus for network handover is provided, where the apparatus includes a receiving unit configured to receive a first message that is sent by a UE and includes first information, where the first information is used to indicate that the UE needs to be handed over from a first network to a second network; and a sending unit configured to send, according to at least the first information, a second message that includes the first information, so that a target gateway device allocates, to the UE according to at least the first information, a second IP address that is the same as a first IP address and used when a second packet data network PDN connection is established by using the second network and the target gateway device, where the first IP address is an IP address used when the UE establishes a first PDN connection by using the first network and the target gateway device.

According to still another aspect, an apparatus for network handover is provided, where the apparatus includes a receiving unit configured to receive a second message that is sent by a second network and includes first information, where the first information is sent by the second network according to at least the first information sent by a UE, and is used to indicate that the UE needs to be handed over from a first network to the second network; and a processing unit configured to determine a first IP address according to at least the first information, where the first IP address is an IP address used when the UE establishes a first PDN connection by using the first network and a target gateway device; and configured to allocate a second IP address that is the same as the first IP address to the UE when the UE establishes a second PDN connection by using the second network.

In a possible implementation manner, the apparatus further includes a sending unit configured to send a sixth message that includes second information to the second network, where the second information is used to indicate the second IP address.

By using the method and apparatus for network handover according to embodiments of the present invention, when a UE is handed over from a first network to a second network, a gateway device obtains a first IP address used when the UE establishes a PDN connection by using the first network, and allocates, to the UE, a second IP address that is the same as the first IP address and used when a PDN connection is established by using the second network. Therefore, service continuity is ensured after a network handover.

BRIEF DESCRIPTION OF THE DRAWINGS

To describe the technical solutions in the embodiments of the present invention more clearly, the following briefly introduces the accompanying drawings required for describing the embodiments of the present invention. The accompanying drawings in the following description show merely some embodiments of the present invention, and a person of ordinary skill in the art may still derive other drawings from these accompanying drawings without creative efforts.

FIG. 1 is a schematic flowchart of a method for network handover according to an embodiment of the present invention;

FIG. 4 is a schematic flowchart of a method for network handover according to another embodiment of the present invention;

FIG. 5 is a schematic flowchart of a method for network handover according to another embodiment of the present invention;

DETAILED DESCRIPTION

Figure 2:
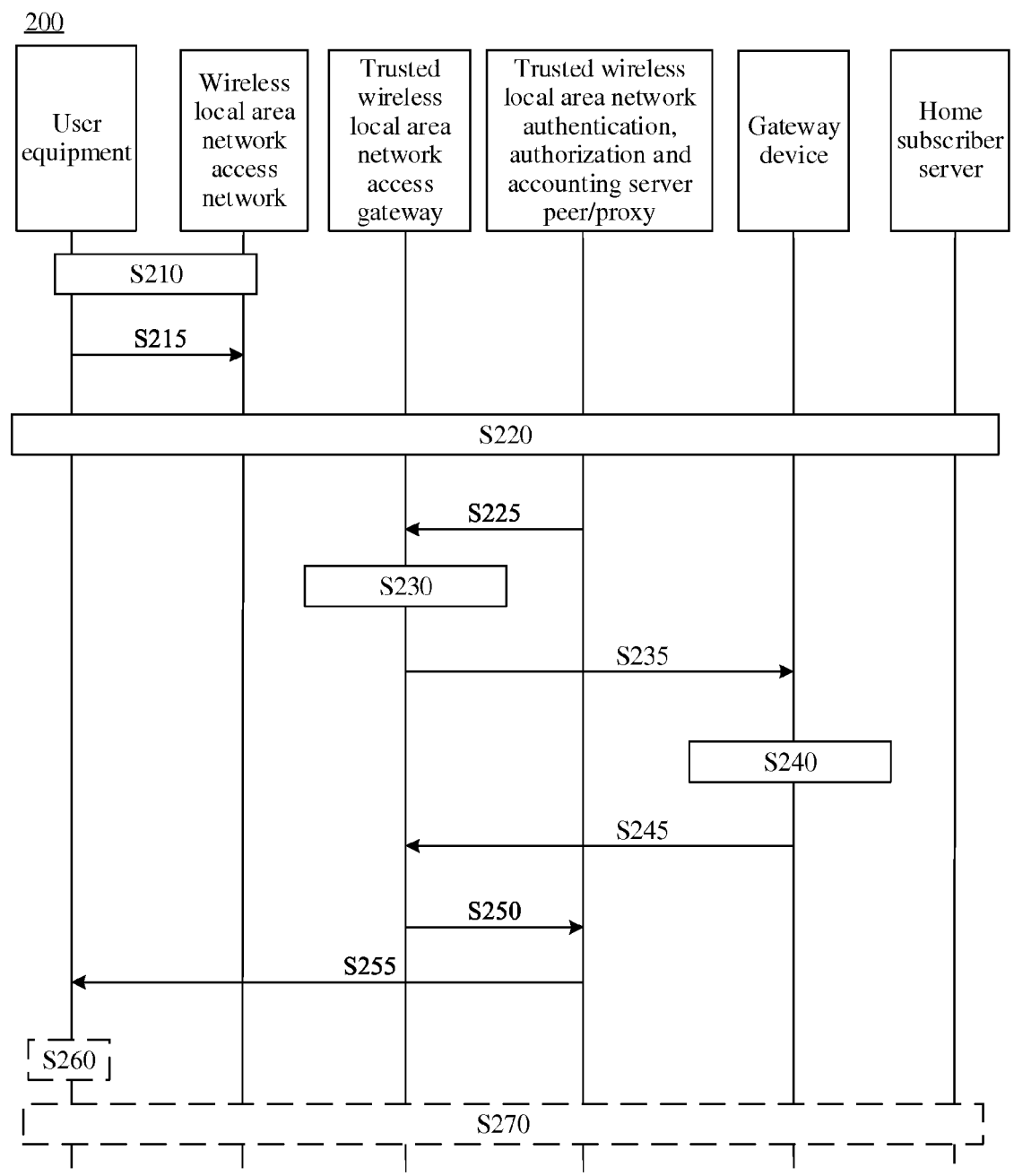
FIG. 2 is a schematic interaction diagram of a method for allocating an IP address to a UE according to an embodiment of the present invention.

The following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

A UE is also known as a mobile terminal, a mobile UE, and the like and may communicate with one or multiple core networks by using a wireless access network (for example, a Radio Access Network (RAN)). The UE may be a mobile terminal, for example, a mobile phone (or referred to as a cellular phone) and a computer equipped with a mobile terminal, such as a portable, pocket-sized, handheld, computer-embedded, or vehicle-mounted mobile device. The mobile devices exchange voice and/or data with the wireless access network.

FIG. 1 is a schematic flowchart of a method for network handover 100 according to an embodiment of the present invention, which is described from a perspective of a UE. As shown in FIG. 1, the method 100 includes the following steps.

S110: Send a first message including first information to a second network, where the first information is used to indicate that a UE needs to be handed over from a first network to the second network, so that a target gateway device allocates, to the UE according to at least a second message that is sent by the second network and includes the first information, a second IP address that is the same as a first IP address and used when a second PDN connection is established by using the second network and the target gateway device, where the first IP address is an IP address used when the UE establishes a first PDN connection by using the first network and the target gateway device.

In S110, the UE may access a service by using the first network, and establish, by using an EPC target gateway device connected to the first network and the second network (hereinafter referred to as a PDN-GW), a PDN connection (including a first PDN connection) for performing the service. In addition, the PDN-GW allocates an IP address corresponding to the PDN connection to the UE. In addition, the UE may use all services accessed by using the first network as services that need to be accessed by using the second network, and therefore may use all IP addresses used in the first network, as first IP addresses that the UE expects to continue to use in the second network. Alternatively, the UE may determine, from the IP addresses according to use of the IP addresses, an IP address (first IP address) that the UE expects to continue to use after the UE is handed over to the second network. For example, if an IP address is being used before a network handover, and a service corresponding to the IP address does not end during the handover, the UE may determine to expect to use the IP address after the UE is handed over to the second network and continue, by using the PDN-GW providing the IP address, the service corresponding to the IP address.

Optionally, in the embodiment of the present invention, the first network includes a 3GPP network.

Optionally, the second network includes a TWAN.

In the following description, the 3GPP is used as an example to describe, instead of to limit, the first network. Corresponding to the first network, the second network is a non-3GPP network. The following uses the TWAN as an example to describe the second network. It should be understood that the illustrated networks are only an embodiment of the present invention and that the present invention is not limited thereto. For example, as a non-3GPP network, code division multiple access (CDMA), wideband code division multiple access (WCDMA), worldwide interoperability for microwave access (WiMAX), wireless fidelity (WIFI), and the like may be illustrated.

The UE may access the EPC by using the 3GPP, and obtain an IP address (first IP address) used when a PDN connection (first PDN connection of the service) is established by using the 3GPP, where the first IP address is allocated to the UE by a target PDN-GW providing the first PDN connection. In the embodiment of the present invention, the method for accessing an EPC by the UE by using the 3GPP and the method for obtaining the first IP address by the UE are the same as the prior art. Herein for avoiding repetition, descriptions about the methods are omitted.

Therefore, when the UE detects that a TWAN may access the EPC, the UE may initiate a handover procedure so as to access the EPC by using the TWAN.

Optionally, in the embodiment of the present invention, before sending the first message to the second network, the method further includes determining that the second network is routable to an EPC.

In addition, the determining that the TWAN is routable to the EPC includes receiving a third message sent by the TWAN, where the third message includes a service set identifier (SSID) of the TWAN; and determining, according to at least the SSID, that the TWAN is routable to the EPC.

The UE discovers that a TWAN is accessible, and determines, by reading the SSID broadcasted by the TWAN and according to at least the SSID, whether the TWAN is a network routable to the EPC.

After determining that the TWAN is a network routable to the EPC, the UE may determine that a second IP address same as the first IP address can be used for data transmission after the UE accesses the EPC by using the TWAN. Thus, the UE may send first information to the TWAN, notifying that the UE needs to be handed over to the TWAN, where the TWAN may determine, according to at least the first information, a PDN connection established by the UE by using the 3GPP.

In the embodiment of the present invention, when accessing the EPC by using the TWAN, the UE may, before initiating an L2 layer attach procedure to the TWAN so as to obtain the IP address used when a PDN connection (second PDN connection of the service) is established by using the TWAN, send the first information to the TWAN (namely, case 1), or may also send the first information to the TWAN by using a Dynamic Host Configuration Protocol Request message for triggering an L3 layer attach procedure, in time of initiating the L3 layer attach procedure to the TWAN so as to obtain the IP address used when a PDN connection (second PDN connection of the service) is established by using the TWAN (the following describes in detail the first information and a process of determining, by the second network according to the first information, that the UE establishes a PDN connection by using the 3GPP) (namely, case 2). The TWAN may select, according to a PDN connection (first PDN connection) of a service that the UE expects to continue to access by using the second network, a target gateway device (providing the PDN connection) corresponding to the PDN connection, and send the first information to the target gateway device (the following describes in detail a process of determining, by the target gateway device according to the first information, that the UE establishes a PDN connection by using the 3GPP). Therefore, when the UE continues to access a service (service already accessed by using the first network) by using the second network, the target gateway device may allocate a second IP address same as the first IP address to the UE. The following describes case 1 and case 2 respectively.

Case 1

FIG. 2 is a schematic interaction diagram of a method 200 for allocating an IP address to a UE according to an embodiment of the present invention. In the embodiment of the present invention, a second network (TWAN) may include a wireless local area network access network (WLAN Access Network), a TWAN authentication, authorization and accounting server peer/proxy (TWAP), a trusted wireless local area network access gateway (TWAG), and the like, where the WLAN includes one or multiple wireless local area network access points that are used to terminate a wireless local area network 802.11 link of a UE defined in the IEEE standard 802.11-2007[64]. The TWAG is used to terminate an S2a function, and is used as a default router on an access link of the UE and a Dynamic Host Configuration Protocol (DHCP) server of the UE. The TWAN is used to provide access to an EPC for the UE, and forward a data packet between a UE-TWAG point-to-point link, and an S2a tunnel of the UE. In the TWAN, a relationship between the UE-TWAG point-to-point link and the S2a tunnel is based on a media access control (MAC) address of the UE. The TWAP is used to terminate an STa function, and relay AAA information between a WAN and a 3GPP AAA server, or relay authentication, authorization and accounting (AAA) information between a WAN and a 3GPP AAA proxy in a roaming case, and establish a MAC address binding between UE subscription data (including an international mobile subscriber identity (IMSI)) and a wireless access network of the UE to provide subscription data of the UE for the TWAG. The STa is an interface between the TWAN and the 3GPP AAA server (3GPP AAA Server), and is used to perform AAA-based authentication for the UE. The S2a is an interface between the TWAN and the PDN-GW, and is used to manage L3 layer mobility and establish a link to access a core network.

As shown in FIG. 2, in S210, when the UE discovers that a WLAN is accessible, the UE executes a specific procedure for accessing a non-3GPP. The procedure is the same as the prior art. To avoid repetition, the description about the procedure is omitted herein.

In S215, the UE may carry first information used to indicate that the UE needs to be handed over from the 3GPP to the TWAN in, for example, a Generic Advertisement Service-Access Network Query Protocol (GAS-ANQP) query message, and send the message to the TWAG. It should be understood that the illustrated GAS-ANQP query message (first message) is only an exemplary description of the present invention, where the first message may also be other GAS-ANQP messages or other messages, and the present invention is not limited thereto.

Optionally, in the embodiment of the present invention, the first information includes first IP address information indicating the first IP address and/or a handover indication identifier indicating that the UE requests to be handed over from the first network to the second network.

The UE may send a GAS-ANQP query message, which carries, for example, 3GPP cellular network information, where the information includes a network handover identifier (Handover indication), indicating to the TWAN that the access is a handover and that the IP address needs to be reserved (the following describes a process of determining the first IP address by the TWAN (specifically, a TWAP) according to the Handover indication). Alternatively, the UE may send a GAS-ANQP query message, which carries, for example, information about a requested IP address, where the information about the requested IP address indicates that the UE expects to be handed over to the TWAN and obtain the first IP address when accessing a service. The TWAN may directly extract the first IP address from the information about the requested IP address. Alternatively, the UE may send a GAS-ANQP query message, which carries, for example, both a Handover indication and information about a requested IP address.

Optionally, in the embodiment of the present invention, the first information includes the handover indication identifier; the number of PDN connections established by the UE by using the first network and including the first PDN connection is at least two; and the first information further includes a first distinct identifier used to indicate the first PDN connection.

If a user establishes multiple PDN connections (the number of IP addresses used for establishing the PDN connections is the same as the number of the PDN connections) by using the 3GPP (an example of the first network), and services indicated by a part of PDN connections need to be handed over but services indicated by the other PDN connections do not need to be handed over, the UE may perform distinction by carrying a bearer identifier (bearer ID) or an access point name (APN) in a GAS-ANQP query message, where the Bearer ID is used to indicate a PDN connection, and the APN may indicate more than two PDN connections. For example, the IP address used by a PDN connection corresponding to the Bearer ID or APN may be used as the first IP address, indicating to the TWAN and PDN-GW that the UE expects to reserve the IP address of the PDN connection corresponding to the Bearer ID or APN, that is, the IP address of the PDN connection corresponding to the Bearer ID or APN is the first IP address. It should be understood that the illustrated method for indicating the first IP address is only an exemplary description of the present invention and that the present invention is not limited thereto. For example, an IP address used by a PDN connection not corresponding to the Bearer ID may also be used as the first IP address or a distinct identifier may also not be carried, representing that the UE expects to hand over all PDN connections established by using the 3GPP. In addition, the illustrated messages, information elements, and identifiers are only exemplary descriptions of the present invention, and the present invention is not limited thereto. Other messages, information elements, and identifiers that can enable the PDN-GW and the like to know the IP address that the UE expects to reserve all fall within the protection scope of the present invention. The following omits description of a same or similar case.

In S220, an EAP authentication procedure is executed, where the procedure is the same as the prior art. Herein for avoiding repetition, description about the procedure is omitted. In the authentication and authorization procedure, the TWAP may obtain user data of the user of the UE from the HSS/AAA, and obtain the IP address used when the UE establishes a PDN connection by using the 3GPP network and the PDN-GW address corresponding to the IP address (or PDN connection).

In S225, the TWAP sends a WLAN Attach Request (Attach Request) message to the TWAG, where the message carries the IP address used when the UE establishes the PDN connection by using the 3GPP network and the PDN-GW address corresponding to the IP address (or PDN connection).

In S230, if the first information sent by the UE in S215 includes first IP address information indicating the first IP address, the TWAG may extract the first IP address from the first IP address information, and select, according to the first IP address, a PDN-GW address corresponding to the first IP address (PDN connection using the first IP address).

If the first information sent by the UE in S215 includes a handover indication identifier indicating that the UE requests to be handed over from the 3GPP to the TWAN, the TWAG may determine that all IP addresses used when the UE establishes PDN connections by using the 3GPP need to be reserved, and therefore, may select PDN-GW addresses obtained from the TWAP and corresponding to all PDN connections.

If the first information sent by the UE in S215 includes a handover indication identifier indicating that the UE requests to be handed over from the 3GPP to the TWAN and a first distinct identifier corresponding to the first IP address, the TWAG may determine, from all IP addresses used when the UE establishes PDN connections by using the 3GPP, an IP address corresponding to the first distinct identifier as the first IP address, and therefore may select a PDN-GW address obtained from the TWAP and providing a PDN connection corresponding to the first IP address.

In S235, the TWAG may send, for example, a Create Session Request message to the PDN-GW according to the selected PDN-GW address, where the message carries the first information. It should be understood that the Create Session Request (second message) is only an exemplary description of the present invention and that the present invention is not limited thereto.

In S240, if the first information includes first IP address information indicating the first IP address, the PDN-GW may extract the first IP address from the first IP address information. Thus, when the UE establishes a PDN connection by using the TWAN, the UE may use the first IP address as an IP address (second IP address) when the UE establishes a PDN connection by using the TWAN.

If the first information includes a handover indication identifier indicating that the UE requests to be handed over from the first network to the second network, the PDN-GW may detect, according to the user information carried in the Create Session Request and indicating the UE, an IP address (first IP address) provided for the UE when the UE establishes a PDN connection by using the 3GPP network, and use the IP address as an IP address (second IP address) when the UE establishes a PDN connection by using the TWAN.

If the first information includes a handover indication identifier indicating that the UE requests to be handed over from the first network to the second network and a first distinct identifier corresponding to the first IP address, the PDN-GW may detect, according to the user information carried in the Create Session Request and indicating the UE, IP addresses provided for the UE when the UE establishes PDN connections by using the 3GPP network, select, from the IP addresses, an IP address corresponding to the first distinct identifier, and use the IP address as an IP address (second IP address) when the UE establishes a PDN connection by using the TWAN.

In the embodiment of the present invention, because the UE sends, before obtaining the IP address used when a PDN connection is established by using the TWAN, to the TWAN, first information indicating that the UE needs to be handed over from the 3GPP to the TWAN, the UE may use the first IP address as an IP address (second IP address) when a PDN connection is established by using the TWAN.

Therefore, optionally, in FIG. 1, in the embodiment of the present invention, the first message is a message sent before the UE sends a fourth message for obtaining the second IP address to the second network, and the method 100 further includes the following steps.

S120: Receive a fifth message sent by the second network, where the fifth message includes second information used to indicate the second IP address.

S130: Determine the second IP address according to at least the second information, and forbid sending the fourth message to the second network.

As shown in FIG. 2, in S245, the PDN-GW may send, for example, a Create Session Response message to the TWAG, where the message carries the second information. It should be understood that the Create Session Response message (sixth message) is only an exemplary description of the present invention and that the present invention is not limited thereto.

In S250, the TWAG may send, for example, a WLAN attach accept (Attach Accept) message to the TWAP, where the message carries the second information.

In S255, the TWAP may send, for example, an EAP authentication success (EAP Success) message to the UE, where the message carries the second information. It should be understood that the EAP Success message (fifth message) is only an exemplary description of the present invention and that the present invention is not limited thereto.

In S260, the UE may obtain a second IP address according to the second information.

Optionally, in the embodiment of the present invention, the second information includes second IP address information indicating the second IP address, and the determining the second IP address according to at least the second information includes extracting the second IP address from the second IP address information.

Optionally, in the embodiment of the present invention, the second information includes a handover success identifier indicating that the UE is successfully handed over from the first network to the second network, and the determining the second IP address according to at least the second information includes using the first IP address as the second IP address according to at least the handover success identifier.

If the second information includes second IP address information, the UE may directly extract the second IP address from the second IP address information.

If the second information includes a handover success identifier, the UE may use the IP address (first IP address) that the UE requests to reserve in the process above as the second IP address.

In the embodiment of the present invention, cases where the PDN-GW has allocated to other UEs at least one IP address (first IP address) used when the UE establishes a PDN connection by using the 3GPP network, may exist. Therefore, a case where the PDN-GW cannot use all IP addresses (first IP addresses) that the UE requests to reserve and are used when the UE establishes PDN connections by using the 3GPP network, as IP addresses when the UE establishes a PDN connection by using the TWAN, may exist.

Therefore, optionally, in the embodiment of the present invention, the second information includes the handover response identifier; the number of first PDN connections including an available first PDN connection is at least two, where an IP address of the available first PDN connection is the same as the second IP address; the second information further includes a second distinct identifier used to indicate the available first PDN connection; and the using the first IP address as the second IP address according to at least the handover response identifier includes determining the available first PDN connection according to at least the second distinct identifier; and using the IP address of the available first PDN connection as the second IP address according to at least the handover response identifier.

If the number of first IP addresses is at least two, and a part of the first IP addresses may be reserved (available first IP addresses) but the other first IP addresses cannot be reserved, the PDN-GW may perform distinction by using a Bearer ID or an APN (an example of the second distinct identifier) carried in the Create Session Response message, and the TWAP may perform distinction by using the Bearer ID or APN carried in the EAP Success message. For example, the first IP address (available first IP address) corresponding to the Bearer ID or APN may be used as the second IP address. It should be understood that the illustrated method for indicating the second IP address is only an exemplary description of the present invention and that the present invention is not limited thereto. For example, a first IP address not corresponding to the Bearer ID or APN may also be used as the second IP address. In addition, the illustrated messages, information elements, and identifiers are only exemplary descriptions of the present invention, and the present invention is not limited thereto. Other messages, information elements, and identifiers that can enable the UE to know the IP address that can be reserved all fall within the protection scope of the present invention.

In addition, in S260, the UE no longer uses an L3 attach procedure to obtain the second IP address.

By using the method for network handover according to the embodiment of the present invention, because the UE uses a second IP address same as the first IP address and does not need to use the L3 attach procedure to obtain the second IP address, thereby reducing a burden of the device and network, and improving service access efficiency and user experience.

In addition, optionally, in the embodiment of the present invention, in S270, the UE may further use the L3 attach procedure to obtain the second IP address. The PDN-GW has allocated a second IP address same as the first IP address to the UE in the EAP authentication process. Therefore, in a process of obtaining the second IP address by using the L3 attach procedure, the PDN-GW allocates a second IP address same as the first IP address to the UE, where other processes of obtaining the second IP address are the same as the prior art. Herein for avoiding repetition, description is omitted.

Case 2

Figure 3:
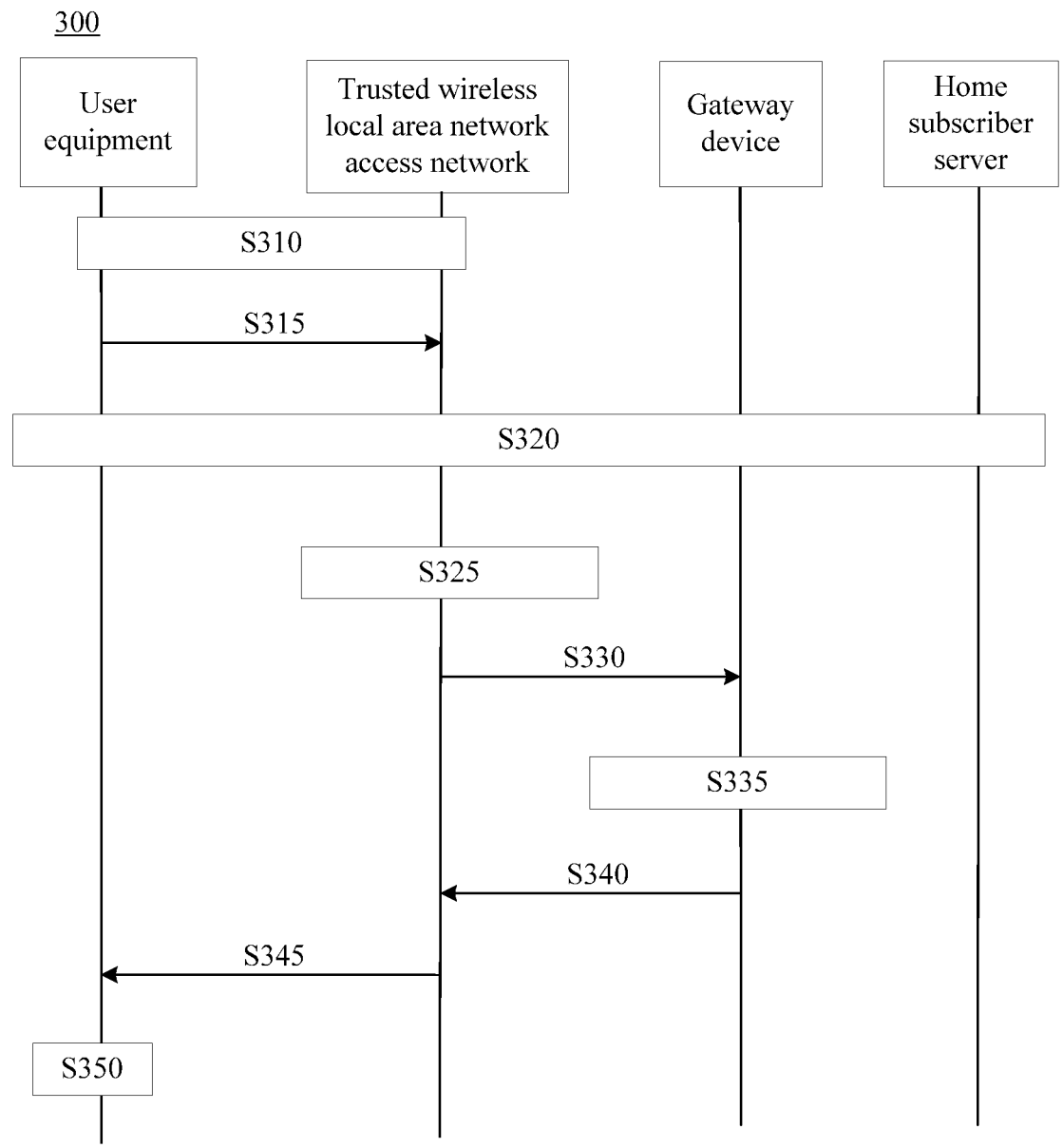
FIG. 3 is another schematic interaction diagram of a method for allocating an IP address to a UE according to an embodiment of the present invention.

FIG. 3 is a schematic interaction diagram of a method 300 for allocating an IP address to a UE according to another embodiment of the present invention. In the embodiment of the present invention, in an L3 layer attach procedure, for configuration of an IP version 4 (IPV4) address, a DHCP version 4 (DHCPV4) request message is used to trigger an L3 layer attach; for configuration of an IP version 6 (IPV6) address, a router solicitation (RS) defined in Internet Engineering Task Force (IETF) Request for Comments (RFC) 5213 or a link local duplicate address detection (LL-DAD) neighbor solicitation (NS) message is used to trigger the L3 layer attach. The TWAN (second network) sends a router advertisement (RA) only after receiving a message for triggering the L3 layer attach.

In the embodiment of the present invention, a DHCPV4 message may be used to trigger an L3 layer attach, or a DHCPV6 message may also be used to trigger the L3 layer attach, which is not limited by the present invention. That a DHCPV4 message is used to trigger an L3 layer attach is used as an example in the following description.

As shown in FIG. 3, in S310, the UE executes a specific access procedure for accessing a non-3GPP. The procedure is the same as the prior art. To avoid repetition, description about the procedure is omitted herein.

In S315, the UE may determine, according to a PDN type of the UE before a handover, what type of an IP address will be reserved, for example, if the original address type is IPV4, the UE may initiate a process of obtaining an IP address of the IPV4 type. In this case, the UE may carry first information used to indicate that the UE needs to be handed over from the 3GPP to the TWAN in, for example, a DHCPV4 Request message, and send the message to the TWAN. It should be understood that the illustrated DHCPV4 Request message (first message) is only an exemplary description of the present invention and that the present invention is not limited thereto. For example, if the original address type is IPV6, a process of obtaining an IP address of the IPV6 type may be initiated.

Optionally, in the embodiment of the present invention, the first information includes first IP address information indicating the first IP address and/or a handover indication identifier indicating that the UE requests to be handed over from the first network to the second network.

The UE may carry, for example, a network handover identifier (Handover indication) in the DHCPV4 Request message, indicating to the TWAN that the access is a handover and that the IP address needs to be reserved (the following describes a process of determining a first IP address by the TWAN according to the Handover indication). Alternatively, the UE may carry, for example, information about a requested IP address in the DHCPV4 Request message, where the information about the requested IP address indicates that the UE needs to be handed over to the TWAN and expects to obtain the first IP address when accessing a service. The TWAN may directly extract the first IP address from the information about the requested IP address. Alternatively, the UE may carry, for example, both a Handover indication and information about a requested IP address in the DHCPV4 Request message.

Optionally, in the embodiment of the present invention, the first information includes the handover indication identifier; the number of IP addresses used when the UE establishes PDN connections by using the first network is at least two; the number of first IP addresses is smaller than the number of IP addresses used when the UE establishes PDN connections by using the first network; and the first information further includes a first distinct identifier corresponding to the first IP address.

If multiple PDN connections (the number of IP addresses used for establishing the PDN connections is the same as the number of the PDN connections) exist in the 3GPP (an example of the first network), and services indicated by a part of PDN connections need to be handed over but services indicated by the other PDN connections do not need to be handed over, the UE may perform distinction by carrying a Bearer ID or an APN in a DHCPV4 Request message, for example, the UE may use an IP address used by the PDN connection corresponding to the Bearer ID or APN as the first IP address, so as to indicate that the UE expects to reserve the IP address of the PDN connection corresponding to the Bearer ID or APN, that is, the IP address of the PDN connection corresponding to the Bearer ID or APN is used as the first IP address. It should be understood that the illustrated method for indicating the first IP address is only an exemplary description of the present invention and that the present invention is not limited thereto. For example, an IP address used by a PDN connection not corresponding to the Bearer ID may also be used as the first IP address. In addition, the illustrated messages, information elements, and identifiers are only exemplary descriptions of the present invention, and the present invention is not limited thereto. Other messages, information elements, and identifiers that can enable the PDN-GW and the like to know the IP address that the UE expects to reserve all fall within the protection scope of the present invention.

In S320, an EAP authentication procedure is executed, where the procedure is the same as the prior art. Herein for avoiding repetition, description about the procedure is omitted. In the authentication and authorization procedure, the TWAN may obtain user data of the user of the UE from the HSS/AAA, and obtain the IP address used when the UE establishes a PDN connection by using the 3GPP network and the PDN-GW address corresponding to the IP address (or PDN connection).

In S325, if the first information sent by the UE in S315 includes first IP address information indicating the first IP address, the TWAN may extract the first IP address from the first IP address information, and select, according to the first IP address, a PDN-GW address corresponding to the first IP address (PDN connection using the first IP address).

If the first information sent by the UE in S315 includes a handover indication identifier indicating that the UE requests to be handed over from the 3GPP to the TWAN, the TWAG may determine that all IP addresses used when the UE establishes PDN connections by using the 3GPP need to be reserved, and therefore, may select PDN-GW addresses obtained from the TWAP and corresponding to all PDN connections.

If the first information sent by the UE in S315 includes a handover indication identifier indicating that the UE requests to be handed over from the 3GPP to the TWAN and a first distinct identifier corresponding to the first IP address, the TWAG may determine, from all IP addresses used when the UE establishes PDN connections by using the 3GPP, an IP address corresponding to the first distinct identifier, as the first IP address, and therefore may select a PDN-GW address obtained from the TWAP and providing a PDN connection corresponding to the first IP address.

In S330, the TWAN may send, for example, a Create Session Request message to the PDN-GW according to the selected PDN-GW address, where the message carries the first information. It should be understood that the Create Session Request message (second message) is only an exemplary description of the present invention and that the present invention is not limited thereto.

In S335, if the first information includes first IP address information indicating the first IP address, the PDN-GW may extract the first IP address from the first IP address information. Thus, when the UE establishes a PDN connection by using the TWAN, the UE may use the first IP address as an IP address when the UE establishes a PDN connection by using the TWAN.

If the first information includes a handover indication identifier indicating that the UE requests to be handed over from the first network to the second network, the PDN-GW may detect, according to the user information carried in the Create Session Request and indicating the UE, an IP address (first IP address) provided for the UE when the UE establishes a PDN connection by using the 3GPP network, and use the IP address as an IP address (second IP address) when the UE establishes a PDN connection by using the TWAN.

If the first information includes a handover indication identifier indicating that the UE requests to be handed over from the first network to the second network and a first distinct identifier corresponding to the first IP address, the PDN-GW may detect, according to the user information carried in the Create Session Request and indicating the UE, IP addresses provided for the UE when the UE establishes PDN connections by using the 3GPP network, select, from the IP addresses, an IP address corresponding to the first distinct identifier, and use the IP address as an IP address (second IP address) when the UE establishes a PDN connection by using the TWAN.

In S340, the PDN-GW may send, for example, a Create Session Response message to the TWAN, where the message carries second information indicating the second IP address. It should be understood that the Create Session Response message is only an exemplary description of the present invention and that the present invention is not limited thereto.

In S345, the TWAN may send, for example, a DHCPV4 Response (DHCPV4 Response) message to the UE, where the message carries the second information. It should be understood that the DHCPV4 Response message is only an exemplary description of the present invention and that the present invention is not limited thereto.

In S350, the UE may obtain a second IP address according to the second information.

Optionally, in the embodiment of the present invention, the second information includes second IP address information indicating the second IP address, and the determining the second IP address according to at least the second information includes extracting the second IP address from the second IP address information.

Optionally, in the embodiment of the present invention, the second information includes a handover success identifier indicating that the UE is successfully handed over from the first network to the second network, and the determining the second IP address according to at least the second information includes using the first IP address as the second IP address according to at least the handover success identifier.

If the second information includes second IP address information, the UE may directly extract the second IP address from the second IP address information.

If the second information includes a handover success identifier, the UE may use the IP address (first IP address) that the UE requests to reserve in the process above as the second IP address.

In the embodiment of the present invention, cases where the PDN-GW has allocated to other UEs at least one IP address (first IP address) used when the UE establishes a PDN connection by using the 3GPP network, may exist. Therefore, a case where the PDN-GW cannot use all IP addresses (first IP addresses) that the UE requests to reserve and are used when the UE establishes PDN connections by using the 3GPP network, as IP addresses when the UE establishes a PDN connection by using the TWAN, may exist.

Therefore, optionally, in the embodiment of the present invention, the second information includes the handover response identifier; the number of first PDN connections including an available first PDN connection is at least two, where an IP address of the available first PDN connection is the same as the second IP address; the second information further includes a second distinct identifier used to indicate the available first PDN connection; and the using the first IP address as the second IP address according to at least the handover response identifier includes determining the available first PDN connection according to at least the second distinct identifier; and using the IP address of the available first PDN connection as the second IP address according to at least the handover response identifier.

If the number of first IP addresses is at least two, and a part of the first IP addresses may be reserved (available first IP addresses) but the other first IP addresses cannot be reserved, the PDN-GW may perform distinction by using a Bearer ID (an example of the second distinct identifier) carried in the Create Session Response message, and the TWAN may perform distinction by using the Bearer ID carried in the DHCPV4 Response message. For example, the first IP address (available first IP address) corresponding to the Bearer ID may be used as the second IP address. It should be understood that the illustrated method for indicating the second IP address is only an exemplary description of the present invention and that the present invention is not limited thereto. For example, a first IP address not corresponding to the Bearer ID may also be used as the second IP address. In addition, the illustrated messages, information elements, and identifiers are only exemplary descriptions of the present invention, and the present invention is not limited thereto. Other messages, information elements, and identifiers that can enable the UE to know the IP address that can be reserved all fall within the protection scope of the present invention.

In the description above, the first message includes a GAS-ANQP query message or a Dynamic Host Configuration Protocol Request message.

The second message includes a Create Session Request message.

The fifth message includes a GAS-ANQP Initial Response message.

The sixth message includes a Create Session Response message.

It should be understood that the illustrated messages are only an exemplary description of the embodiment of the present invention and are not limited particularly.

By using the method for network handover according to the embodiment of the present invention, when a UE is handed over from a first network to a second network, a gateway device obtains a first IP address used when the UE establishes a PDN connection by using the first network, and allocates, to the UE, a second IP address that is the same as the first IP address and used when a PDN connection is established by using the second network. Therefore, service continuity is ensured after a network handover.

FIG. 4 is a schematic flowchart of a method for network handover 400 according to an embodiment of the present invention, which is described from a perspective of a TWAN. As shown in FIG. 4, the method 400 includes the following steps.

S410: Receive a first message that is sent by a UE and includes first information, where the first information is used to indicate that the UE needs to be handed over from a first network to a second network.

S420: Send, according to the first information, a second message including the first information, so that a target gateway device allocates, to the UE according to at least the first information, a second IP address that is the same as a first IP address and used when a second PDN connection is established by using the second network and the target gateway device, where the first IP address is an IP address used when the UE establishes a first PDN connection by using the first network and the target gateway device.

The UE may access a service by using the first network, and establish, by using an EPC target gateway device connected to the first network and the second network (hereinafter referred to as a PDN-GW), a PDN connection (including a first PDN connection) for performing the service. In addition, the PDN-GW allocates an IP address corresponding to the PDN connection to the UE. In addition, the UE may use all services accessed by using the first network as services that need to be accessed by using the second network, and therefore may use all IP addresses used in the first network, as first IP addresses that the UE expects to continue to use in the second network. Alternatively, the UE may determine, from the IP addresses according to use of the IP addresses, an IP address (first IP address) that the UE expects to continue to use after the UE is handed over to the second network. For example, if an IP address is being used before a network handover, and a service corresponding to the IP address does not end during the handover, the UE may determine to expect to use the IP address after the UE is handed over to the second network and continue, by using the PDN-GW providing the IP address, the service corresponding to the IP address.

Optionally, in the embodiment of the present invention, the first network includes a 3GPP network.

Optionally, the second network includes a TWAN.

In the following description, the 3GPP is used as an example to describe, instead of to limit, the first network. Corresponding to the first network, the second network is a non-3GPP network. The following uses the TWAN as an example to describe the second network. It should be understood that the illustrated networks are only an embodiment of the present invention and that the present invention is not limited thereto. For example, as a non-3GPP network, CDMA, WCDMA, WiMAX, WIFI, and the like may be illustrated.

The UE may access the EPC by using the 3GPP, and obtain an IP address (first IP address) used when a PDN connection is established by using the 3GPP, where the IP address is allocated to the UE by a target PDN-GW (PDN-GW for short unless otherwise specified) providing the first PDN connection. In the embodiment of the present invention, the method for accessing an EPC by the UE by using the 3GPP and the method for obtaining the first IP address by the UE are the same as the prior art. Herein for avoiding repetition, descriptions about the methods are omitted.

Therefore, when the UE detects that a TWAN may access the EPC, the UE may initiate a handover procedure so as to access the EPC by using the TWAN. In addition, the UE may notify the TWAN of first information used to indicate that the UE needs to be handed over from the 3GPP to the TWAN.

In S410, the TWAN receives the first information. In the embodiment of the present invention, when accessing the EPC by using the TWAN, the UE may, before initiating an L2 layer attach procedure to the TWAN so as to obtain the IP address used when a PDN connection (second PDN connection of the service) is established by using the TWAN (namely, case 3), send the first information to the TWAN, or may also send the first information to the TWAN by using a Dynamic Host Configuration Protocol Request message for triggering an L3 layer attach procedure, in time of initiating the L3 layer attach procedure to the TWAN so as to obtain the IP address used when a PDN connection (second PDN connection of the service) is established by using the TWAN (the following describes in detail the first information and a process of determining, by the second network according to the first information, that the UE establishes a PDN connection by using the 3GPP) (namely, case 4). The TWAN may select, according to a PDN connection (first PDN connection) of a service that the UE expects to continue to access by using the second network, a target gateway device (providing the PDN connection) corresponding to the PDN connection, and send the first information to the target gateway device (the following describes in detail a process of determining, by the target gateway device according to the first information, that the UE establishes a PDN connection by using the 3GPP). Therefore, when the UE continues to access a service (service already accessed by using the first network) by using the second network, the target gateway device may allocate a second IP address same as the first IP address to the UE. The following describes case 3 and case 4 respectively.

Case 3

FIG. 2 is a schematic interaction diagram of a method 200 for allocating an IP address to a UE according to an embodiment of the present invention. In the embodiment of the present invention, a second network (TWAN) may include a WLAN, a TWAP, a TWAG, and on the like, where the WLAN includes one or multiple wireless local area network access points that are used to terminate a wireless local area network 802.11 link of a UE defined in the Institute of Electrical and Electronics Engineers (IEEE) standard 802.11-2007[64]. The TWAG is used to terminate an S2a function, and is used as a default router on an access link of the UE and a DHCP server of the UE. The TWAN is used to provide access to an EPC for the UE, and forward a data packet between a UE-TWAG point-to-point link, and an S2a tunnel of the UE. In the TWAN, a relationship between the UE-TWAG point-to-point link and the S2a tunnel is based on a MAC address of the UE. The TWAP is used to terminate an STa function, and relay AAA information between a WAN and a 3GPP AAA server, or relay AAA information between a WAN and a 3GPP AAA proxy in a roaming case, and establish a MAC address binding between UE subscription data (including an IMSI) and a wireless access network of the UE to provide subscription data of the UE for the TWAG. The STa is an interface between the TWAN and the 3GPP AAA server (3GPP AAA Server), and is used to perform AAA-based authentication for the UE. The S2a is an interface between the TWAN and a PDN-GW, and is used to manage L3 layer mobility and establish a link to access a core network.

As shown in FIG. 2, in S210, when the UE discovers that a WLAN is accessible, the UE executes a specific procedure for accessing a non-3GPP. The procedure is the same as the prior art. To avoid repetition, the description about the procedure is omitted herein.

In S215, the UE may carry first information used to indicate that the UE needs to be handed over from the 3GPP to the TWAN in, for example, a GAS-ANQP query message, and send the message to the TWAG. It should be understood that the illustrated GAS-ANQP query message (first message) is only an exemplary description of the present invention, where the first message may also be other GAS-ANQP messages or other messages, and the present invention is not limited thereto.

Optionally, in the embodiment of the present invention, the sending, according to the first information, a second message including the first information includes obtaining user data of the UE according to the first information, where the user data includes a mapping relationship between a PDN connection established by the UE by using the first network and a gateway device providing the PDN connection; and sending, according to the user data, a second message including the first information.

Optionally, in the embodiment of the present invention, the first information includes first IP address information indicating the first IP address, and the sending, according to the user data, a second message including the first information includes extracting the first IP address from the first IP address information; determining the first PDN connection according to at least the first IP address; determining the target gateway device according to at least the first PDN connection and the user data; and sending a second message including the first information to the target gateway device.

Optionally, in the embodiment of the present invention, the first information includes a handover indication identifier, and the sending, according to the user data, a second message including the first information includes sending, according to at least the user data, a second message including the first information to the gateway device including the target gateway device.

The UE may send a GAS-ANQP query message, which carries, for example, 3GPP cellular network information, where the information includes a network handover identifier (Handover indication), indicating to the TWAN that the access is a handover and that the IP address needs to be reserved (the following describes a process of determining a first IP address by the TWAN (specifically, a TWAP) according to the Handover indication). Alternatively, the UE may send a GAS-ANQP query message, which carries, for example, information about a requested IP address, where the information about the requested IP address indicates that the UE expects to be handed over to the TWAN and obtain the first IP address when accessing a service. The TWAN may directly extract the first IP address from the information about the requested IP address. Alternatively, the UE may send a GAS-ANQP query message, which carries, for example, both a Handover indication and information about a requested IP address.

Optionally, in the embodiment of the present invention, the first information includes the handover indication identifier; the number of PDN connections established by the UE by using the first network and including the first PDN connection is at least two; the first information further includes a first distinct identifier used to indicate the first PDN connection; and the sending, according to at least the user data, a second message including the first information includes determining the first PDN connection according to at least the first distinct identifier; determining the target gateway device according to at least the first PDN connection and the user data; and sending a second message including the first information to the target gateway device; or the sending, according to at least the user data, a second message including the first information includes sending, according to at least the user data, a second message including the first information to the gateway device including the target gateway device.

If a user establishes multiple PDN connections (the number of IP addresses used for establishing the PDN connections is the same as the number of the PDN connections) by using the 3GPP (an example of the first network), and services indicated by a part of PDN connections need to be handed over but services indicated by the other PDN connections do not need to be handed over, the UE may perform distinction by carrying a Bearer ID or an APN in a GAS-ANQP query message, where the Bearer ID is used to indicate a PDN connection, and the APN may indicate more than two PDN connections. For example, the IP address used by a PDN connection corresponding to the Bearer ID or APN may be used as the first IP address, indicating to the TWAN and PDN-GW that the UE expects to reserve the IP address of the PDN connection corresponding to the Bearer ID or APN, that is, the IP address of the PDN connection corresponding to the Bearer ID or APN is the first IP address. It should be understood that the illustrated method for indicating the first IP address is only an exemplary description of the present invention and that the present invention is not limited thereto. For example, an IP address used by a PDN connection not corresponding to the Bearer ID may also be used as the first IP address or a distinct identifier may also not be carried, indicating that the UE expects to hand over all PDN connections established by using the 3GPP. In addition, the illustrated messages, information elements, and identifiers are only exemplary descriptions of the present invention, and the present invention is not limited thereto. Other messages, information elements, and identifiers that can enable the PDN-GW and the like to know the IP address that the UE expects to reserve all fall within the protection scope of the present invention. The following omits description of a same or similar case.

In S220, an EAP authentication procedure is executed, where the procedure is the same as the prior art. Herein for avoiding repetition, description about the procedure is omitted. In the authentication and authorization procedure, the TWAP (second network) may obtain user data of the user of the UE from the HSS/AAA, and obtain the IP address used when the UE establishes a PDN connection by using the 3GPP network and the PDN-GW address corresponding to the IP address (or PDN connection) (corresponding to S420 in FIG. 4).

In S225, the TWAP sends a WLAN Attach Request (Attach Request) message to the TWAG, where the message carries the IP address used when the UE establishes the PDN connection by using the 3GPP network and the PDN-GW address corresponding to the IP address (or PDN connection).

In S230, if the first information sent by the UE in S215 includes first IP address information indicating the first IP address, the TWAG may extract the first IP address from the first IP address information, and select, according to the first IP address, a PDN-GW address corresponding to the first IP address (PDN connection using the first IP address).

If the first information sent by the UE in S215 includes a handover indication identifier indicating that the UE requests to be handed over from the 3GPP to the TWAN, the TWAG may determine that all IP addresses used when the UE establishes PDN connections by using the 3GPP need to be reserved, and therefore, may select PDN-GW addresses obtained from the TWAP and corresponding to all PDN connections.

If the first information sent by the UE in S215 includes a handover indication identifier indicating that the UE requests to be handed over from the 3GPP to the TWAN and a first distinct identifier corresponding to the first IP address, the TWAG may determine, from all IP addresses used when the UE establishes PDN connections by using the 3GPP, an IP address corresponding to the first distinct identifier, as the first IP address, and therefore may select a PDN-GW address obtained from the TWAP and providing a PDN connection corresponding to the first IP address.

In S235 (corresponding to S420 in FIG. 4), the TWAG (second network) may send, for example, a Create Session Request message to the PDN-GW according to the selected PDN-GW address, where the message carries the first information. It should be understood that the Create Session Request (second message) is only an exemplary description of the present invention and that the present invention is not limited thereto.

In S240, if the first information includes first IP address information indicating the first IP address, the PDN-GW may extract the first IP address from the first IP address information. Thus, when the UE establishes a PDN connection by using the TWAN, the UE may use the first IP address as an IP address (second IP address) when the UE establishes a PDN connection by using the TWAN.

If the first information includes a handover indication identifier indicating that the UE requests to be handed over from the first network to the second network, the PDN-GW may detect, according to the user information carried in the Create Session Request and indicating the UE, an IP address (first IP address) provided for the UE when the UE establishes a PDN connection by using the 3GPP network, and use the IP address as an IP address (second IP address) when the UE establishes a PDN connection by using the TWAN.

If the first information includes a handover indication identifier indicating that the UE requests to be handed over from the first network to the second network and a first distinct identifier corresponding to the first IP address, the PDN-GW may detect, according to the user information carried in the Create Session Request and indicating the UE, IP addresses provided for the UE when the UE establishes PDN connections by using the 3GPP network, select, from the IP addresses, an IP address corresponding to the first distinct identifier, and use the IP address as an IP address (second IP address) when the UE establishes a PDN connection by using the TWAN.

In the embodiment of the present invention, because the UE sends, before obtaining the IP address used when a PDN connection is established by using the TWAN, to the TWAN, first information indicating that the UE needs to be handed over from the 3GPP to the TWAN, the UE may use the first IP address as an IP address (second IP address) when a PDN connection is established by using the TWAN.

Therefore, optionally, in the embodiment of the present invention, the method further includes determining, before receiving the first message, that a fourth message that is sent by the UE and used for obtaining the second IP address is not received; receiving a sixth message sent by the target gateway device, where the sixth message includes second information used to indicate the second IP; and sending a fifth message to the UE, where the fifth message includes the second information used to indicate the second IP address.

As shown in FIG. 2, in S245, the PDN-GW may send, for example, a Create Session Response (Create Session Response) message to the TWAG, where the message carries the second information. It should be understood that the Create Session Response message (sixth message) is only an exemplary description of the present invention and that the present invention is not limited thereto.

In S250, the TWAG may send, for example, a WLAN attach accept (Attach Accept) message to the TWAP, where the message carries the second information.

In S255, the TWAP may send, for example, an EAP Success message to the UE, where the message carries the second information. It should be understood that the EAP Success message (fifth message) is only an exemplary description of the present invention and that the present invention is not limited thereto.

In S260, the UE may obtain a second IP address according to the second information.

For example, if the second information includes second IP address information, the UE may directly extract the second IP address from the second IP address information.

If the second information includes a handover response identifier, the UE may use the IP address (first IP address) that the UE requests to reserve in the process above as the second IP address.

In the embodiment of the present invention, cases where the PDN-GW has allocated to other UEs at least one IP address (first IP address) used when the UE establishes a PDN connection by using the 3GPP network, may exist. Therefore, a case where the PDN-GW cannot use all IP addresses (first IP addresses) that the UE requests to reserve and are used when the UE establishes PDN connections by using the 3GPP network, as IP addresses when the UE establishes a PDN connection by using the TWAN, may exist.

Therefore, if the number of first IP addresses is at least two, and a part of the first IP addresses may be reserved (available first IP addresses) but the other first IP addresses cannot be reserved, the PDN-GW may perform distinction by using a Bearer ID or an APN (an example of the second distinct identifier) carried in the Create Session Response message, and the TWAP may perform distinction by using the Bearer ID or APN carried in the EAP Success message. For example, the first IP address (available first IP address) corresponding to the Bearer ID or APN may be used as the second IP address. It should be understood that the illustrated method for indicating the second IP address is only an exemplary description of the present invention and that the present invention is not limited thereto. For example, a first IP address not corresponding to the Bearer ID or APN may also be used as the second IP address. In addition, the illustrated messages, information elements, and identifiers are only exemplary descriptions of the present invention, and the present invention is not limited thereto. Other messages, information elements, and identifiers that can enable the UE to know the IP address that can be reserved all fall within the protection scope of the present invention.

In S260, the UE no longer uses an L3 attach procedure to obtain the second IP address.

By using the method for network handover according to the embodiment of the present invention, because the UE uses a second IP address same as the first IP address and does not need to use the L3 attach procedure to obtain the second IP address, thereby reducing a burden of the device and network, and improving service access efficiency and user experience.

In addition, optionally, in the embodiment of the present invention, in S270, the UE may further use the L3 attach procedure to obtain the second IP address. The PDN-GW has allocated a second IP address same as the first IP address to the UE in the EAP authentication process. Therefore, in a process of obtaining the second IP address by using the L3 attach procedure, the PDN-GW allocates a second IP address same as the first IP address to the UE, where other processes of obtaining the second IP by using the L3 attach procedure are the same as the prior art. Herein for avoiding repetition, description is omitted.

Case 4

FIG. 3 is a schematic interaction diagram of a method 300 for allocating an IP address to a UE according to another embodiment of the present invention. In the embodiment of the present invention, in an L3 layer attach procedure, for configuration of an IPV4 address, a DHCPV4 request message is used to trigger an L3 layer attach; for configuration of an IPV6 address, an RS defined in IETF RFC 5213 or an LL-DAD NS message is used to trigger the L3 layer attach. The TWAN (second network) sends a RA only after receiving a message for triggering the L3 layer attach.

In the embodiment of the present invention, a DHCPV4 message may be used to trigger an L3 layer attach, or a DHCPV6 message may also be used to trigger the L3 layer attach, which is not limited by the present invention. That a DHCPV4 message is used to trigger an L3 layer attach is used as an example in the following description.

As shown in FIG. 3, in S310, the UE executes a specific access procedure for accessing a non-3GPP. The procedure is the same as the prior art. To avoid repetition, description about the procedure is omitted herein.

In S315, the UE may determine, according to a PDN type of the UE before a handover, what type of an IP address will be reserved, for example, if the original address type is IPV4, the UE may initiate a process of obtaining an IP address of the IPV4 type. In this case, the UE may carry first information used to indicate that the UE needs to be handed over from the 3GPP to the TWAN in, for example, a DHCPV4 Request message, and send the message to the TWAN. It should be understood that the illustrated DHCPV4 Request message (first message) is only an exemplary description of the present invention and that the present invention is not limited thereto. For example, if the original address type is IPV6, a process of obtaining an IP address of the IPV6 type may be initiated.

Optionally, in the embodiment of the present invention, the sending, according to the first information, a second message including the first information includes obtaining user data of the UE according to the first information, where the user data includes a mapping relationship between a PDN connection established by the UE by using the first network and a gateway device providing the PDN connection; and sending, according to the user data, a second message including the first information.

Optionally, in the embodiment of the present invention, the first information includes first IP address information indicating the first IP address, and the sending, according to the user data, a second message including the first information includes extracting the first IP address from the first IP address information; determining the first PDN connection according to at least the first IP address; determining the target gateway device according to at least the first PDN connection and the user data; and sending a second message including the first information to the target gateway device.

Optionally, in the embodiment of the present invention, the first information includes a handover indication identifier, and the sending, according to the user data, a second message including the first information includes sending, according to at least the user data, a second message including the first information to the gateway device including the target gateway device.

The UE may carry, for example, a network handover identifier (Handover indication) in the DHCPV4 Request message, indicating to the TWAN that the access is a handover and that the IP address needs to be reserved (the following describes a process of determining a first IP address by the TWAN according to the Handover indication). Alternatively, the UE may carry, for example, information about a requested IP address in the DHCPV4 Request message, where the information about the requested IP address information indicates that the UE needs to be handed over to the TWAN and expects to obtain the first IP address when accessing a service. The TWAN may directly extract the first IP address from the information about the requested IP address. Alternatively, the UE may carry, for example, both a Handover indication and information about a requested IP address in the DHCPV4 Request message.

Optionally, in the embodiment of the present invention, the first information includes the handover indication identifier; the number of PDN connections established by the UE by using the first network and including the first PDN connection is at least two; the first information further includes a first distinct identifier used to indicate the first PDN connection; and the sending, according to at least the user data, a second message including the first information includes determining the first PDN connection according to at least the first distinct identifier; determining the target gateway device according to at least the first PDN connection and the user data; and sending a second message including the first information to the target gateway device; or the sending, according to at least the user data, a second message including the first information includes the sending, according to at least the user data, a second message including the first information to the gateway device including the target gateway device.

If multiple PDN connections (the number of IP addresses used for establishing the PDN connections is the same as the number of the PDN connections) exist in the 3GPP (an example of the first network), and services indicated by a part of PDN connections need to be handed over but services indicated by the other PDN connections do not need to be handed over, the UE may perform distinction by carrying a Bearer ID or an APN in a DHCPV4 Request message, for example, the UE may use an IP address used by the PDN connection corresponding to the Bearer ID or APN as the first IP address, so as to indicate that the UE expects to reserve the IP address of the PDN connection corresponding to the Bearer ID or APN, that is, the IP address of the PDN connection corresponding to the Bearer ID or APN is used as the first IP address. It should be understood that the illustrated method for indicating the first IP address is only an exemplary description of the present invention and that the present invention is not limited thereto. For example, an IP address used by a PDN connection not corresponding to the Bearer ID may also be used as the first IP address. In addition, the illustrated messages, information elements, and identifiers are only exemplary descriptions of the present invention, and the present invention is not limited thereto. Other messages, information elements, and identifiers that can enable the PDN-GW and the like to know the IP address that the UE expects to reserve all fall within the protection scope of the present invention.

In S320, an EAP authentication procedure is executed, where the procedure is the same as the prior art. Herein for avoiding repetition, description about the procedure is omitted. In the authentication and authorization procedure, the TWAN (second network) may obtain user data of the user of the UE from the HSS/AAA, and obtain the IP address used when the UE establishes a PDN connection by using the 3GPP network and the PDN-GW address corresponding to the IP address (or PDN connection) (corresponding to S420 in FIG. 4).

In S325, if the first information sent by the UE in S315 includes first IP address information indicating the first IP address, the TWAN may extract the first IP address from the first IP address information, and select, according to the first IP address, a PDN-GW address corresponding to the first IP address (PDN connection using the first IP address).

If the first information sent by the UE in S315 includes a handover indication identifier indicating that the UE requests to be handed over from the 3GPP to the TWAN, the TWAG may determine that all IP addresses used when the UE establishes PDN connections by using the 3GPP need to be reserved, and therefore, may select PDN-GW addresses obtained from the TWAP and corresponding to all PDN connections.

If the first information sent by the UE in S315 includes a handover indication identifier indicating that the UE requests to be handed over from the 3GPP to the TWAN and a first distinct identifier corresponding to the first IP address, the TWAG may determine, from all IP addresses used when the UE establishes PDN connections by using the 3GPP, an IP address corresponding to the first distinct identifier, as the first IP address, and therefore may select a PDN-GW address obtained from the TWAP and providing a PDN connection corresponding to the first IP address.

In S330, the TWAN (second network) may send, for example, a Create Session Request message to the PDN-GW according to the selected PDN-GW address, where the message carries the first information. It should be understood that the Create Session Request (second message) is only an exemplary description of the present invention and that the present invention is not limited thereto.

In S335, if the first information includes first IP address information indicating the first IP address, the PDN-GW may extract the first IP address from the first IP address information. Thus, when the UE establishes a PDN connection by using the TWAN, the UE may use the first IP address as an IP address (second IP address) when the UE establishes a PDN connection by using the TWAN.

If the first information includes a handover indication identifier indicating that the UE requests to be handed over from the first network to the second network, the PDN-GW may detect, according to the user information carried in the Create Session Request and indicating the UE, an IP address (first IP address) provided for the UE when the UE establishes a PDN connection by using the 3GPP network, and use the IP address as an IP address (second IP address) when the UE establishes a PDN connection by using the TWAN.

If the first information includes a handover indication identifier indicating that the UE requests to be handed over from the first network to the second network and a first distinct identifier corresponding to the first IP address, the PDN-GW may detect, according to the user information carried in the Create Session Request and indicating the UE, IP addresses provided for the UE when the UE establishes PDN connections by using the 3GPP network, select, from the IP addresses, an IP address corresponding to the first distinct identifier, and use the IP address as an IP address (second IP address) when the UE establishes a PDN connection by using the TWAN.

In S340, the PDN-GW may send, for example, a Create Session Response message to the TWAN, where the message carries second information indicating the second IP address. It should be understood that the Create Session Response message is only an exemplary description of the present invention and that the present invention is not limited thereto.

In S345, the TWAN may send, for example, a DHCPV4 Response message to the UE, where the message carries the second information. It should be understood that the DHCPV4 Response message is only an exemplary description of the present invention and that the present invention is not limited thereto.

In S350, the UE may obtain a second IP address according to the second information. For example, if the second information includes a handover response identifier, the UE may use the IP address (first IP address) that the UE requests to reserve in the process above as the second IP address.

In the embodiment of the present invention, cases where the PDN-GW has allocated to other UEs at least one IP address (first IP address) used when the UE establishes a PDN connection by using the 3GPP network, may exist. Therefore, a case where the PDN-GW cannot use all IP addresses (first IP addresses) that the UE requests to reserve and are used when the UE establishes PDN connections by using the 3GPP network, as IP addresses when the UE establishes a PDN connection by using the TWAN, may exist.

Therefore, if the number of first IP addresses is at least two, and a part of the first IP addresses may be reserved (available first IP addresses) but the other first IP addresses cannot be reserved, the PDN-GW may perform distinction by using a Bearer ID (an example of the second distinct identifier) carried in the Create Session Response message, and the TWAN may perform distinction by using the Bearer ID carried in the DHCPV4 Response message. For example, the first IP address (available first IP address) corresponding to the Bearer ID may be used as the second IP address. It should be understood that the illustrated method for indicating the second IP address is only an exemplary description of the present invention and that the present invention is not limited thereto. For example, a first IP address not corresponding to the Bearer ID may also be used as the second IP address. In addition, the illustrated messages, information elements, and identifiers are only exemplary descriptions of the present invention, and the present invention is not limited thereto. Other messages, information elements, and identifiers that can enable the UE to know the IP address that can be reserved all fall within the protection scope of the present invention.

In the description above, the first message includes a GAS-ANQP query message or a Dynamic Host Configuration Protocol Request message.

The second message includes a Create Session Request message.

The fifth message includes a GAS-ANQP Initial Response message.

The sixth message includes a Create Session Response message.

It should be understood that the illustrated messages are only an exemplary description of the embodiment of the present invention and are not limited particularly.

By using the method for network handover according to the embodiment of the present invention, when a UE is handed over from a first network to a second network, a gateway device obtains a first IP address used when the UE establishes a PDN connection by using the first network, and allocates, to the UE, a second IP address that is the same as the first IP address and used when a PDN connection is established by using the second network. Therefore, service continuity is ensured after a network handover.

FIG. 5 is a schematic flowchart of a method for network handover 500 according to an embodiment of the present invention, which is described from a perspective of a PDN-GW. As shown in FIG. 5, the method 500 includes the following steps.

S510: Receive a second message that is sent by a second network and includes first information, where the second message is sent by the second network according to at least a first message that is sent by a UE and includes the first information, and the first information is used to indicate that the UE needs to be handed over from a first network to the second network.

S520: Determine a first IP address according to at least the first information, where the first IP address is an IP address used when the UE establishes a first PDN connection by using the first network and a target gateway device.

S530: Allocate a second IP address that is the same as the first IP address to the UE when the UE establishes a second PDN connection by using the second network.

The UE may access a service by using the first network, and establish, by using an EPC target gateway device connected to the first network and the second network (hereinafter referred to as a PDN-GW), a PDN connection (including a first PDN connection) for performing the service. In addition, the PDN-GW allocates an IP address corresponding to the PDN connection to the UE. In addition, the UE may use all services accessed by using the first network as services that need to be accessed by using the second network, and therefore may use all IP addresses used in the first network, as first IP addresses that the UE expects to continue to use in the second network. Alternatively, the UE may determine, from the IP addresses according to use of the IP addresses, an IP address (first IP address) that the UE expects to continue to use after the UE is handed over to the second network. For example, if an IP address is being used before a network handover, and a service corresponding to the IP address does not end during the handover, the UE may determine to expect to use the IP address after the UE is handed over to the second network and continue, by using the PDN-GW providing the IP address, the service corresponding to the IP address.

Optionally, in the embodiment of the present invention, the first network includes a 3GPP network.

Optionally, the second network includes a TWAN.

In the following description, the 3GPP is used as an example to describe, instead of to limit, the first network. Corresponding to the first network, the second network is a non-3GPP network. The following uses the TWAN as an example to describe the second network. It should be understood that the illustrated networks are only an embodiment of the present invention and that the present invention is not limited thereto. For example, as a non-3GPP network, CDMA, WCDMA, WiMAX, WIFI, and the like may be illustrated.

The UE may access the EPC by using the 3GPP, and obtain an IP address (first IP address) used when a PDN connection is established by using the 3GPP, where the IP address is allocated to the UE by a target PDN-GW (PDN-GW for short unless otherwise specified) providing the first PDN connection. In the embodiment of the present invention, the method for accessing an EPC by the UE by using the 3GPP and the method for obtaining the first IP address by the UE are the same as the prior art. Herein for avoiding repetition, descriptions about the methods are omitted.

Therefore, when the UE detects that a TWAN may access the EPC, the UE may initiate a handover procedure so as to access the EPC by using the TWAN. In addition, in the embodiment of the present invention, when accessing the EPC by using the TWAN, the UE may, before initiating an L2 layer attach procedure to the TWAN so as to obtain the IP address used when a PDN connection (second PDN connection of the service) is established by using the TWAN (namely, case 5), send the first information to the TWAN, or may also send the first information to the TWAN by using a Dynamic Host Configuration Protocol Request message for triggering an L3 layer attach procedure, in time of initiating the L3 layer attach procedure to the TWAN so as to obtain the IP address used when a PDN connection (second PDN connection of the service) is established by using the TWAN (the following describes in detail the first information and a process of determining, by the second network according to the first information, that the UE establishes a PDN connection by using the 3GPP) (namely, case 6). The TWAN may select, according to a PDN connection (first PDN connection) of a service that the UE expects to continue to access by using the second network, a target gateway device (providing the PDN connection) corresponding to the PDN connection, and send the first information to the target gateway device (the following describes in detail a process of determining, by the target gateway device according to the first information, that the UE establishes a PDN connection by using the 3GPP). Therefore, when the UE continues to access a service (service already accessed by using the first network) by using the second network, the target gateway device may allocate a second IP address same as the first IP address to the UE. The following describes case 5 and case 6 respectively.

Case 5

FIG. 2 is a schematic interaction diagram of a method 200 for allocating an IP address to a UE according to an embodiment of the present invention. In the embodiment of the present invention, a second network (TWAN) may include a WLAN, a TWAP, a TWAG, and the like, where the WLAN includes one or multiple wireless local area network access points that are used to terminate a wireless local area network 802.11 link of a UE defined in the IEEE standard 802.11-2007[64]. The TWAG is used to terminate an S2a function, and is used as a default router on an access link of the UE and a DHCP server of the UE. The TWAN is used to provide access to an EPC for the UE, and forward a data packet between a UE-TWAG point-to-point link, and an S2a tunnel of the UE. In the TWAN, a relationship between the UE-TWAG point-to-point link and the S2a tunnel is based on a MAC address of the UE. The TWAP is used to terminate an STa function, and relay AAA information between a WAN and a 3GPP AAA server, or relay AAA information between a WAN and a 3GPP AAA proxy in a roaming case, and establish a MAC address binding between UE subscription data (including an IMSI) and a wireless access network of the UE to provide subscription data of the UE for the TWAG. The STa is an interface between the TWAN and the 3GPP AAA server, and is used to perform AAA-based authentication for the UE. The S2a is an interface between the TWAN and a PDN-GW, and is used to manage L3 layer mobility and establish a link to access a core network.

As shown in FIG. 2, in S210, when the UE discovers that a WLAN is accessible, the UE executes a specific procedure for accessing a non-3GPP. The procedure is the same as the prior art. To avoid repetition, description about the procedure is omitted herein.

In S215, the UE may carry first information used to indicate that the UE needs to be handed over from the 3GPP to the TWAN in, for example, a GAS-ANQP query message, and send the message to the TWAG. It should be understood that the illustrated GAS-ANQP query message (first message) is only an exemplary description of the present invention, where the first message may also be other GAS-ANQP messages or other messages, and the present invention is not limited thereto.

For example, the UE may send a GAS-ANQP query message, which carries, for example, 3GPP cellular network information, where the information includes a network handover identifier (Handover indication), indicating to the TWAN that the access is a handover and that the IP address needs to be reserved (the following describes a process of determining a first IP address by the TWAN (specifically, a TWAP) according to the Handover indication). Alternatively, the UE may send a GAS-ANQP query message, which carries, for example, information about a requested IP address, where the information about the requested IP address indicates that the UE expects to be handed over to the TWAN and obtain the first IP address when accessing a service. The TWAN may directly extract the first IP address from the information about the requested IP address. Alternatively, the UE may send a GAS-ANQP query message, which carries, for example, both a Handover indication and information about a requested IP address.

In addition, if a user establishes multiple PDN connections (the number of IP addresses used for establishing the PDN connections is the same as the number of the PDN connections) by using the 3GPP (an example of the first network), and services indicated by a part of PDN connections need to be handed over but services indicated by the other PDN connections do not need to be handed over, the UE may perform distinction by carrying a Bearer ID or an APN in a GAS-ANQP query message, where the Bearer ID is used to indicate a PDN connection, and the APN may indicate more than two PDN connections. For example, the IP address used by a PDN connection corresponding to the Bearer ID or APN may be used as the first IP address, indicating to the TWAN and PDN-GW that the UE expects to reserve the IP address of the PDN connection corresponding to the Bearer ID or APN, that is, the IP address of the PDN connection corresponding to the Bearer ID or APN is the first IP address. It should be understood that the illustrated method for indicating the first IP address is only an exemplary description of the present invention and that the present invention is not limited thereto. For example, an IP address used by a PDN connection not corresponding to the Bearer ID may also be used as the first IP address or a distinct identifier may also not be carried, indicating that the UE expects to hand over all PDN connections established by using the 3GPP. In addition, the illustrated messages, information elements, and identifiers are only exemplary descriptions of the present invention, and the present invention is not limited thereto. Other messages, information elements, and identifiers that can enable the PDN-GW and the like to know the IP address that the UE expects to reserve all fall within the protection scope of the present invention. The following omits description of a same or similar case.

In S220, an EAP authentication procedure is executed, where the procedure is the same as the prior art. Herein for avoiding repetition, description about the procedure is omitted. In the authentication and authorization procedure, the TWAP may obtain user data of the user of the UE from the HSS/AAA, and obtain the IP address used when the UE establishes a PDN connection by using the 3GPP network and the PDN-GW address corresponding to the IP address (or PDN connection).

In S225, the TWAP sends a WLAN Attach Request (Attach Request) message to the TWAG, where the message carries the IP address used when the UE establishes the PDN connection by using the 3GPP network and the PDN-GW address corresponding to the IP address (or PDN connection).

In S230, if the first information sent by the UE in S215 includes first IP address information indicating the first IP address, the TWAG may extract the first IP address from the first IP address information, and select, according to the first IP address, a PDN-GW address corresponding to the first IP address (PDN connection using the first IP address).

If the first information sent by the UE in S215 includes a handover indication identifier indicating that the UE requests to be handed over from the 3GPP to the TWAN, the TWAG may determine that all IP addresses used when the UE establishes PDN connections by using the 3GPP need to be reserved, and therefore, may select PDN-GW addresses obtained from the TWAP and corresponding to all PDN connections.

If the first information sent by the UE in S215 includes a handover indication identifier indicating that the UE requests to be handed over from the 3GPP to the TWAN and a first distinct identifier corresponding to the first IP address, the TWAG may determine, from all IP addresses used when the UE establishes PDN connections by using the 3GPP, an IP address corresponding to the first distinct identifier, as the first IP address, and therefore may select a PDN-GW address obtained from the TWAP and providing a PDN connection corresponding to the first IP address.

In S235, the TWAG (second network) may send, for example, a Create Session Request message to the PDN-GW according to the selected PDN-GW address, where the message carries the first information. Meanwhile, the PDN-GW receives the first information (corresponding to S510 in FIG. 5). It should be understood that the Create Session Request message (second message) is only an exemplary description of the present invention and that the present invention is not limited thereto.

Optionally, in the embodiment of the present invention, the first information includes first IP address information indicating the first IP address, and the determining the first IP address according to at least the first information includes extracting the first IP address from the first IP address information.

Optionally, in the embodiment of the present invention, the first information includes a handover indication identifier, and the determining the first IP address according to at least the first information includes determining, according to at least the handover indication identifier, an IP address used when the UE establishes a PDN connection by using the first network, as the first IP address.

In S240 (corresponding to S520 in FIG. 5), if the first information includes first IP address information indicating the first IP address, the PDN-GW may extract the first IP address from the first IP address information. Thus, when the UE establishes a PDN connection by using the TWAN, the UE may use the first IP address as an IP address (second IP address) when the UE establishes a PDN connection by using the TWAN.

If the first information includes a handover indication identifier indicating that the UE requests to be handed over from the first network to the second network, the PDN-GW may detect, according to the user information carried in the Create Session Request and indicating the UE, an IP address (first IP address) provided for the UE when the UE establishes a PDN connection by using the 3GPP network, and use the IP address as an IP address (second IP address) when the UE establishes a PDN connection by using the TWAN.

Optionally, in the embodiment of the present invention, the first information includes the handover indication identifier; the number of PDN connections established by the UE by using the first network and including the first PDN connection is at least two; the first information further includes a first distinct identifier used to indicate the first PDN connection; and the determining the first IP address according to at least the first information includes determining the first PDN connection according to at least the first distinct identifier; and determining the IP address of the first PDN connection as the first IP address according to at least the handover indication identifier.

If the first information includes a handover indication identifier indicating that the UE requests to be handed over from the first network to the second network and a first distinct identifier, the PDN-GW may detect, according to the user information carried in the Create Session Request and indicating the UE, an IP address provided for the UE when the UE establishes a PDN connection by using the 3GPP network, and use the IP address (first IP address) corresponding to the first distinct identifier as an IP address (second IP address) when the UE establishes a PDN connection by using the TWAN.

In the embodiment of the present invention, because the UE sends, before obtaining the IP address used when a PDN connection is established by using the TWAN, to the TWAN, first information indicating that the UE needs to be handed over from the 3GPP to the TWAN, the UE may use the first IP address as an IP address (second IP address) when a PDN connection is established by using the TWAN.

Therefore, optionally, in the embodiment of the present invention, the method further includes sending a sixth message to the second network, where the sixth message includes second information used to indicate the second IP address.

As shown in FIG. 2, in S245, the PDN-GW may send, for example, a Create Session Response message to the TWAG, where the message carries the second information. It should be understood that the Create Session Response message (sixth message) is only an exemplary description of the present invention and that the present invention is not limited thereto.

In S250, the TWAG may send, for example, a WLAN attach accept (Attach Accept) message to the TWAP, where the message carries the second information.

In S255, the TWAP may send, for example, an EAP Success message to the UE, where the message carries the second information. It should be understood that the EAP Success message (fifth message) is only an exemplary description of the present invention and that the present invention is not limited thereto.

In S260, the UE may obtain a second IP address according to the second information.

For example, if the second information includes second IP address information, the UE may directly extract the second IP address from the second IP address information.

If the second information includes a handover response identifier, the UE may use the IP address (first IP address) that the UE requests to reserve in the process above as the second IP address.

In the embodiment of the present invention, cases where the PDN-GW has allocated to other UEs at least one IP address (first IP address) used when the UE establishes a PDN connection by using the 3GPP network, may exist. Therefore, a case where the PDN-GW cannot use all IP addresses (first IP addresses) that the UE requests to reserve and are used when the UE establishes PDN connections by using the 3GPP network, as IP addresses when the UE establishes a PDN connection by using the TWAN, may exist.

Therefore, in the embodiment of the present invention, the second information includes second IP address information indicating the second IP address and/or a handover response identifier indicating that the UE is successfully handed over from the first network to the second network.

If the number of first IP addresses is at least two, and a part of the first IP addresses may be reserved (available first IP addresses) but the other first IP addresses cannot be reserved, the PDN-GW may perform distinction by using a Bearer ID or an APN (an example of the second distinct identifier) carried in the Create Session Response message, and the TWAP may perform distinction by using the Bearer ID or APN carried in the EAP Success message. For example, the first IP address (available first IP address) corresponding to the Bearer ID or APN may be used as the second IP address. It should be understood that the illustrated method for indicating the second IP address is only an exemplary description of the present invention and that the present invention is not limited thereto. For example, a first IP address not corresponding to the Bearer ID or APN may also be used as the second IP address. In addition, the illustrated messages, information elements, and identifiers are only exemplary descriptions of the present invention, and the present invention is not limited thereto. Other messages, information elements, and identifiers that can enable the UE to know the IP address that can be reserved all fall within the protection scope of the present invention.

In S260, the UE no longer uses an L3 attach procedure to obtain the second IP address.

By using the method for network handover according to the embodiment of the present invention, because the UE uses a second IP address same as the first IP address and does not need to use the L3 attach procedure to obtain the second IP address, thereby reducing a burden of the device and network, and improving service access efficiency and user experience.

In addition, optionally, in the embodiment of the present invention, in S270, the UE may further use the L3 attach procedure to obtain the second IP address. The PDN-GW has allocated a second IP address same as the first IP address to the UE in the EAP authentication process. Therefore, in a process of obtaining the second IP address by using the L3 attach procedure, the PDN-GW allocates a second IP address same as the first IP address to the UE, where other processes of obtaining the second IP by using the L3 attach procedure are the same as the prior art. Herein for avoiding repetition, description is omitted.

Case 6

FIG. 3 is a schematic interaction diagram of a method 300 for allocating an IP address to a UE according to another embodiment of the present invention. In the embodiment of the present invention, in an L3 layer attach procedure, for configuration of an IPV4 address, a DHCPV4 request message is used to trigger an L3 layer attach; for configuration of an IPV6 address, an RS defined in IETF RFC 5213 or an LL-DAD NS message is used to trigger the L3 layer attach.

The TWAN (second network) sends a RA only after receiving a message for triggering the L3 layer attach.

In the embodiment of the present invention, a DHCPV4 message may be used to trigger an L3 layer attach, or a DHCPV6 message may also be used to trigger the L3 layer attach, which is not limited by the present invention. That a DHCPV4 message is used to trigger an L3 layer attach is used as an example in the following description.

As shown in FIG. 3, in S310, the UE executes a specific access procedure for accessing a non-3GPP. The procedure is the same as the prior art. To avoid repetition, description about the procedure is omitted herein.

In S315, the UE may determine, according to a PDN type of the UE before a handover, what type of an IP address will be reserved, for example, if the original address type is IPV4, the UE may initiate a process of obtaining an IP address of the IPV4 type. In this case, the UE may carry first information used to indicate that the UE needs to be handed over from the 3GPP to the TWAN in, for example, a DHCPV4 Request message, and send the message to the TWAN. It should be understood that the illustrated DHCPV4 Request message (first message) is only an exemplary description of the present invention and that the present invention is not limited thereto. For example, if the original address type is IPV6, a process of obtaining an IP address of the IPV6 type may be initiated.

Optionally, in the embodiment of the present invention, the first information includes first IP address information indicating the first IP address and/or a handover indication identifier indicating that the UE requests to be handed over from the first network to the second network.

The UE may carry, for example, a network handover identifier (Handover indication) in the DHCPV4 Request message, indicating to the TWAN that the access is a handover and that the IP address needs to be reserved (the following describes a process of determining a first IP address by the TWAN according to the Handover indication). Alternatively, the UE may carry, for example, information about a requested IP address in the DHCPV4 Request message, where the information about the requested IP address indicates that the UE needs to be handed over to the TWAN and expects to obtain the first IP address when accessing a service. The TWAN may directly extract the first IP address from the information about the requested IP address. Alternatively, the UE may carry, for example, both a Handover indication and information about a requested IP address in the DHCPV4 Request message.

Optionally, in the embodiment of the present invention, the first information includes the handover indication identifier; the number of IP addresses used when the UE establishes PDN connections by using the first network is at least two; the number of first IP addresses is smaller than the number of IP addresses used when the UE establishes PDN connections by using the first network; and the first information further includes a first distinct identifier corresponding to the first IP address.

If multiple PDN connections (the number of IP addresses used for establishing the PDN connections is the same as the number of the PDN connections) exist in the 3GPP (an example of the first network), and services indicated by a part of PDN connections need to be handed over but services indicated by the other PDN connections do not need to be handed over, the UE may perform distinction by carrying a Bearer ID or an APN in a DHCPV4 Request message, for example, the UE may use an IP address used by the PDN connection corresponding to the Bearer ID or APN as the first IP address, so as to indicate that the UE expects to reserve the IP address of the PDN connection corresponding to the Bearer ID or APN, that is, the IP address of the PDN connection corresponding to the Bearer ID or APN is used as the first IP address. It should be understood that the illustrated method for indicating the first IP address is only an exemplary description of the present invention and that the present invention is not limited thereto. For example, an IP address used by a PDN connection not corresponding to the Bearer ID may also be used as the first IP address. In addition, the illustrated messages, information elements, and identifiers are only exemplary descriptions of the present invention, and the present invention is not limited thereto. Other messages, information elements, and identifiers that can enable the PDN-GW and the like to know the IP address that the UE expects to reserve all fall within the protection scope of the present invention.

In S320, an EAP authentication procedure is executed, where the procedure is the same as the prior art. Herein for avoiding repetition, description about the procedure is omitted. In the authentication and authorization procedure, the TWAN may obtain user data of the user of the UE from the HSS/AAA, and obtain the IP address used when the UE establishes a PDN connection by using the 3GPP network and the PDN-GW address corresponding to the IP address (or PDN connection).

In S325, if the first information sent by the UE in S315 includes first IP address information indicating the first IP address, the TWAN may extract the first IP address from the first IP address information, and select, according to the first IP address, a PDN-GW address corresponding to the first IP address (PDN connection using the first IP address).

If the first information sent by the UE in S315 includes a handover indication identifier indicating that the UE requests to be handed over from the 3GPP to the TWAN, the TWAG may determine that all IP addresses used when the UE establishes PDN connections by using the 3GPP need to be reserved, and therefore, may select PDN-GW addresses obtained from the TWAP and corresponding to all PDN connections.

If the first information sent by the UE in S315 includes a handover indication identifier indicating that the UE requests to be handed over from the 3GPP to the TWAN and a first distinct identifier corresponding to the first IP address, the TWAG may determine, from all IP addresses used when the UE establishes PDN connections by using the 3GPP, an IP address corresponding to the first distinct identifier, as the first IP address, and therefore may select a PDN-GW address obtained from the TWAP and providing a PDN connection corresponding to the first IP address.

In S330, the TWAN may send, for example, a Create Session Request message to the PDN-GW according to the selected PDN-GW address, where the message carries the first information. Meanwhile, the PDN-GW receives the first information (corresponding to S510 in FIG. 5). It should be understood that the Create Session Request message (second message) is only an exemplary description of the present invention and that the present invention is not limited thereto.

Optionally, in the embodiment of the present invention, the first information includes first IP address information indicating the first IP address, and the determining the first IP address according to at least the first information includes extracting the first IP address from the first IP address information.

Optionally, in the embodiment of the present invention, the first information includes a handover indication identifier, and the determining the first IP address according to at least the first information includes determining, according to at least the handover indication identifier, an IP address used when the UE establishes a PDN connection by using the first network, as the first IP address.

In S335 (corresponding to S520 in FIG. 5), if the first information includes first IP address information indicating the first IP address, the PDN-GW may extract the first IP address from the first IP address information. Thus, when the UE establishes a PDN connection by using the TWAN, the UE may use the first IP address as an IP address (second IP address) when the UE establishes a PDN connection by using the TWAN.

If the first information includes a handover indication identifier indicating that the UE requests to be handed over from the first network to the second network, the PDN-GW may detect, according to the user information carried in the Create Session Request and indicating the UE, an IP address (first IP address) provided for the UE when the UE establishes a PDN connection by using the 3GPP network, and use the IP address as an IP address (second IP address) when the UE establishes a PDN connection by using the TWAN.

Optionally, in the embodiment of the present invention, the first information includes the handover indication identifier; the number of PDN connections established by the UE by using the first network and including the first PDN connection is at least two; the first information further includes a first distinct identifier used to indicate the first PDN connection; and the determining the first IP address according to at least the first information includes determining the first PDN connection according to at least the first distinct identifier; and determining the IP address of the first PDN connection as the first IP address according to at least the handover indication identifier.

If the first information includes a handover indication identifier indicating that the UE requests to be handed over from the first network to the second network and a first distinct identifier corresponding to the first IP address, the PDN-GW may detect, according to the user information carried in the Create Session Request and indicating the UE, IP addresses provided for the UE when the UE establishes PDN connections by using the 3GPP network, select, from the IP addresses, an IP address corresponding to the first distinct identifier, and use the IP address as an IP address (second IP address) when the UE establishes a PDN connection by using the TWAN.

In S340, the PDN-GW may send, for example, a Create Session Response message to the TWAN, where the message carries second information indicating the second IP address. It should be understood that the Create Session Response message is only an exemplary description of the present invention and that the present invention is not limited thereto.

In S345, the TWAN may send, for example, a DHCPV4 Response message to the UE, where the message carries the second information. It should be understood that the DHCPV4 Response message is only an exemplary description of the present invention and that the present invention is not limited thereto.

In S350, the UE may obtain a second IP address according to the second information. For example, if the second information includes a handover response identifier, the UE may use the IP address (first IP address) that the UE requests to reserve in the process above as the second IP address.

In the embodiment of the present invention, cases where the PDN-GW has allocated to other UEs at least one IP address (first IP address) used when the UE establishes a PDN connection by using the 3GPP network, may exist.

Therefore, a case where the PDN-GW cannot use all IP addresses (first IP addresses) that the UE requests to reserve and are used when the UE establishes PDN connections by using the 3GPP network, as IP addresses when the UE establishes a PDN connection by using the TWAN, may exist.

Therefore, if the number of first IP addresses is at least two, and a part of the first IP addresses may be reserved (available first IP addresses) but the other first IP addresses cannot be reserved, the PDN-GW may perform distinction by using a Bearer ID (an example of the second distinct identifier) carried in the Create Session Response message, and the TWAN may perform distinction by using the Bearer ID carried in the DHCPV4 Response message. For example, the first IP address (available first IP address) corresponding to the Bearer ID may be used as the second IP address. It should be understood that the illustrated method for indicating the second IP address is only an exemplary description of the present invention and that the present invention is not limited thereto. For example, a first IP address not corresponding to the Bearer ID may also be used as the second IP address. In addition, the illustrated messages, information elements, and identifiers are only exemplary descriptions of the present invention, and the present invention is not limited thereto. Other messages, information elements, and identifiers that can enable the UE to know the IP address that can be reserved all fall within the protection scope of the present invention.

In the description above, the first message includes a GAS-ANQP query message or a Dynamic Host Configuration Protocol Request message.

The second message includes a Create Session Request message.

The fifth message includes a GAS-ANQP Initial Response message.

The sixth message includes a Create Session Response message.

It should be understood that the illustrated messages are only an exemplary description of the embodiment of the present invention and are not limited particularly.

By using the method for network handover according to the embodiment of the present invention, when a UE is handed over from a first network to a second network, a gateway device obtains a first IP address used when the UE establishes a PDN connection by using the first network, and allocates, to the UE, a second IP address that is the same as the first IP address and used when a PDN connection is established by using the second network. Therefore, service continuity is ensured after a network handover.

As described above, the method for network handover according to the embodiments of the present invention has been described in detail with reference to FIG. 1 to FIG. 5. The following describes in detail an apparatus for network handover according to the embodiments of the present invention with reference to FIG. 6 and FIG. 7.

Figure 6:
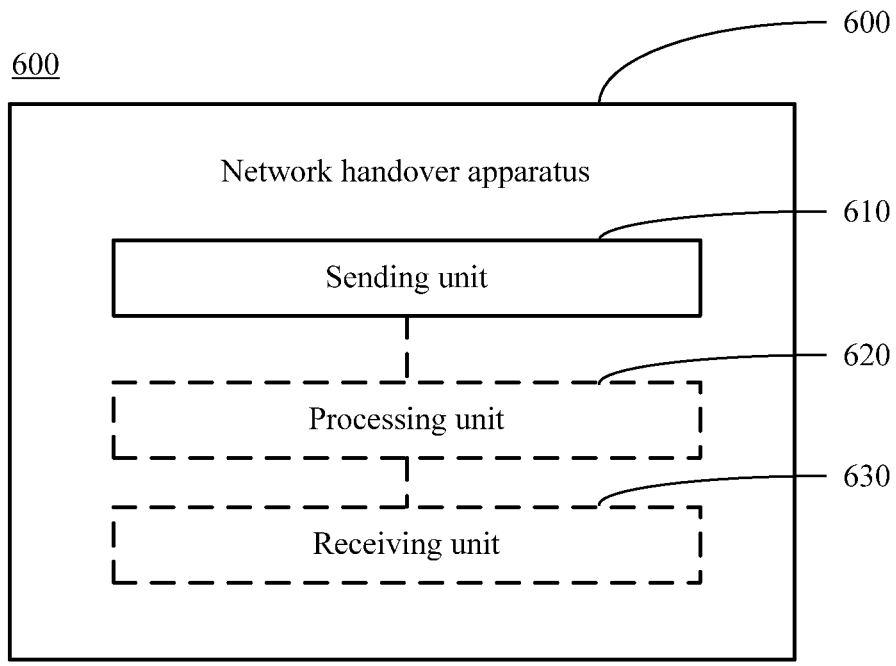
FIG. 6 is a schematic block diagram of an apparatus for network handover according to an embodiment of the present invention.

FIG. 6 is a schematic block diagram of an apparatus 600 for network handover according to an embodiment of the present invention. As shown in FIG. 6, the apparatus 600 includes a sending unit 610 configured to send a first message including first information to a second network, where the first information is used to indicate that the UE needs to be handed over from a first network to the second network, so that a target gateway device allocates, to the UE according to at least a second message that is sent by the second network and includes the first information, a second IP address that is the same as a first IP address and used when a second PDN connection is established by using the second network and the target gateway device, where the first IP address is an IP address used when the UE establishes a first PDN connection by using the first network and the target gateway device.

The apparatus 600 (UE) may access the first network, and establish a PDN connection (including a first PDN connection) by using an EPC target gateway device (hereinafter referred to as a PDN-GW) connected to the first network and second network. In addition, the PDN-GW allocates an IP address corresponding to the PDN connection to the UE, and the UE may use all IP addresses used in the first network as the first IP address. Alternatively, the UE may determine, from the IP addresses according to use of the IP addresses, an IP address (first IP address) that the UE expects to continue to use after the UE is handed over to the second network. For example, if an IP address is being used before a network handover, and a service corresponding to the IP address does not end during the handover, the UE may determine to expect to use the IP address after the UE is handed over to the second network and continue, by using the PDN-GW providing the IP address, the service corresponding to the IP address.

Optionally, the first network includes a 3GPP network.

Optionally, the second network includes a TWAN.

Optionally, the apparatus 600 further includes a processing unit 620 configured to determine that the second network is routable to an EPC.

Optionally, the apparatus 600 further includes a receiving unit 630 configured to receive a third message sent by the TWAN, where the third message includes a service set identifier SSID of the TWAN; and the processing unit 620 is configured to determine, according to at least the SSID, that the TWAN is routable to the EPC.

The UE discovers that a TWAN is accessible, and determines, by reading the SSID broadcasted by the TWAN and according to the SSID, whether the TWAN is a network routable to the EPC.

After determining that the TWAN is a network routable to the EPC, the UE may determine that a second IP address same as the first IP address can be used for data transmission after the UE accesses the EPC by using the TWAN. Therefore, the UE may notify the TWAN of the first IP address.

Optionally, the first information includes first IP address information indicating the first IP address and/or a handover indication identifier.

The UE may send a GAS-ANQP query message or a DHCPV4 Request message to the TWAN, where the message carries, for example, 3GPP cellular network information, and the information includes a network handover identifier (Handover indication), indicating to the TWAN that the access is a handover and that the IP address needs to be reserved (the following describes a process of determining a first IP address by the TWAN (specifically, a TWAP) according to the Handover indication). Alternatively, the UE may send a GAS-ANQP query message or a DHCPV4 Request message, which carries, for example, information about a requested IP address, and the information about the requested IP address indicates that the UE expects to obtain the first IP address. The TWAN may directly extract the first IP address from the information about the requested IP address. Alternatively, the UE may send a GAS-ANQP query message or a DHCPV4 Request message, which carries, for example, both a Handover indication and information about a requested IP address.

Optionally, the first information includes the handover indication identifier; the number of PDN connections established by the UE by using the first network and including the first PDN connection is at least two; and the first information further includes a first distinct identifier used to indicate the first PDN connection.

If a user establishes multiple PDN connections by using the 3GPP (an example of the first network) (the number of IP addresses used for establishing the PDN connections is the same as the number of the PDN connections), and a part of PDN connections need to be handed over but other PDN connections do not need to be handed over, the UE may perform distinction by carrying a Bearer ID or an APN in a GAS-ANQP query message, where the Bearer ID is used to indicate a PDN connection, and the APN may indicate more than two PDN connections. For example, the IP address used by a PDN connection corresponding to the Bearer ID or APN may be used as the first IP address, indicating to the TWAN or PDN-GW that the UE expects to reserve the IP address of the PDN connection corresponding to the Bearer ID or APN, that is, the IP address of the PDN connection corresponding to the Bearer ID or APN is the first IP address. It should be understood that the illustrated method for indicating the first IP address is only an exemplary description of the present invention and that the present invention is not limited thereto. For example, an IP address used by a PDN connection not corresponding to the Bearer ID may also be used as the first IP address or a distinct identifier may also not be carried, indicating that the UE expects to hand over all PDN connections established by using the 3GPP. In addition, the illustrated messages, information elements, and identifiers are only exemplary descriptions of the present invention, and the present invention is not limited thereto. Other messages, information elements, and identifiers that can enable the PDN-GW and so on to know the IP address that the UE expects to reserve all fall within the protection scope of the present invention. The following omits description of a same or similar case.

Optionally, the processing unit 620 is further configured to determine that the first message is a message sent before the UE sends a fourth message for obtaining the second IP address to the second network, and the apparatus 600 further includes a receiving unit 630 configured to receive a fifth message sent by the second network, where the fifth message includes second information used to indicate the second IP address; and the processing unit 620 is further configured to determine the second IP address according to at least the second information, and forbid the sending unit to send the fourth message to the second network.

The PDN-GW may send, for example, a Create Session Response message to the TWAG, where the message carries the second information. It should be understood that the Create Session Response message (sixth message) is only an exemplary description of the present invention and that the present invention is not limited thereto.

The TWAN may send, for example, an EAP Success message to the UE, where the message carries the second information. It should be understood that the EAP Success message (fifth message) is only an exemplary description of the present invention and that the present invention is not limited thereto. The UE no longer uses an L3 attach procedure to obtain the second IP address.

If the second information includes second IP address information, the UE may directly extract the second IP address from the second IP address information.

If the second information includes a handover response identifier, the UE may use the IP address (first IP address) that the UE requests to reserve in the process above as the second IP address.

Optionally, the second information includes second IP address information indicating the second IP address, and the processing unit 620 is configured to extract the second IP address from the second IP address information.

Optionally, the second information includes a handover response identifier indicating that the UE is successfully handed over from the first network to the second network, and the processing unit 620 is configured to use the first IP address as the second IP address according to at least the handover response identifier.

In the embodiment of the present invention, cases where the PDN-GW has allocated to other UEs at least one IP address (first IP address) used when the UE establishes a PDN connection by using the 3GPP network, may exist. Therefore, a case where the PDN-GW cannot use all IP addresses (first IP addresses) that the UE requests to reserve and are used when the UE establishes PDN connections by using the 3GPP network, as IP addresses when the UE establishes a PDN connection by using the TWAN, may exist.

Therefore, optionally, in the embodiment of the present invention, the second information includes the handover response identifier; the number of first PDN connections including an available first PDN connection is at least two, where an IP address of the available first PDN connection is the same as the second IP address; the second information further includes a second distinct identifier used to indicate the available first PDN connection; and the processing unit 620 is configured to determine the available first PDN connection according to at least the second distinct identifier; and configured to use the IP address of the available first PDN connection as the second IP address according to at least the handover response identifier.

If the number of first IP addresses is at least two, and a part of the first IP addresses may be reserved (available first IP addresses) but the other first IP addresses cannot be reserved, the PDN-GW may perform distinction by using a Bearer ID or an APN (an example of the second distinct identifier) carried in the Create Session Response message, and the TWAP may perform distinction by using the Bearer ID or APN carried in the EAP Success message. For example, the first IP address (available first IP address) corresponding to the Bearer ID or APN may be used as the second IP address. It should be understood that the illustrated method for indicating the second IP address is only an exemplary description of the present invention and that the present invention is not limited thereto. For example, a first IP address not corresponding to the Bearer ID or APN may also be used as the second IP address. In addition, the illustrated messages, information elements, and identifiers are only exemplary descriptions of the present invention, and the present invention is not limited thereto. Other messages, information elements, and identifiers that can enable the UE to know the IP address that can be reserved all fall within the protection scope of the present invention.

The apparatus 600 for network handover according to the embodiment of the present invention may correspond to the UE in the method according to the embodiment of the present invention. In addition, the units in the apparatus 600 for network handover, namely, modules, and other operations and/or functions above respectively implement the corresponding procedures in the method 100 in FIG. 1. Details are not repeated herein for brevity.

By using the apparatus for network handover according to the embodiment of the present invention, when a UE is handed over from a first network to a second network, a gateway device obtains a first IP address used when the UE establishes a PDN connection by using the first network, and allocates, to the UE, a second IP address that is the same as the first IP address and used when a PDN connection is established by using the second network. Therefore, service continuity is ensured after a network handover.

Figure 7:
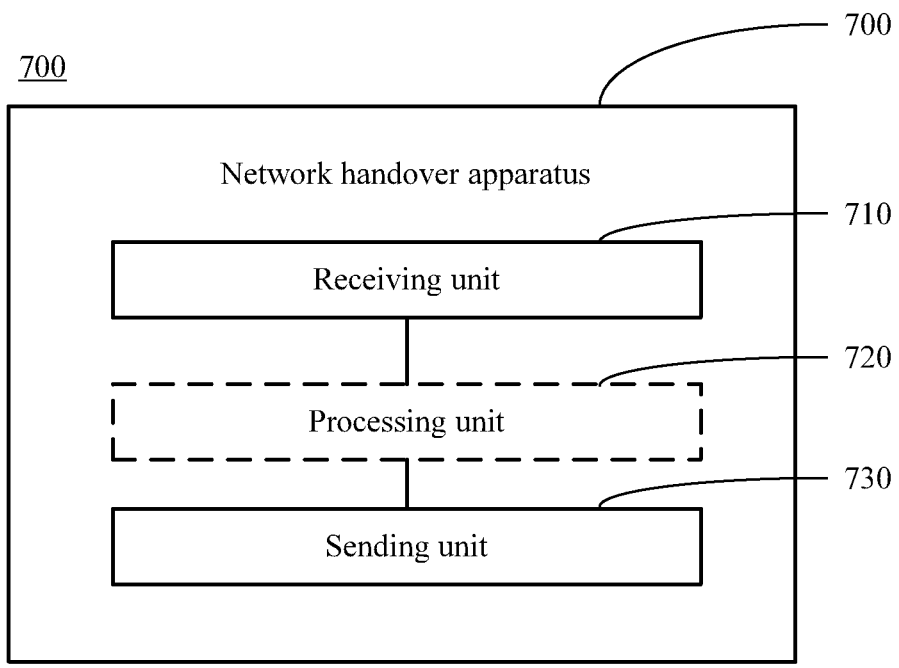
FIG. 7 is a schematic block diagram of an apparatus for network handover according to another embodiment of the present invention.

FIG. 7 is a schematic block diagram of an apparatus 700 for network handover according to an embodiment of the present invention. As shown in FIG. 7, the apparatus 700 includes a receiving unit 710 configured to receive a first message that is sent by a UE and includes first information, where the first information is used to indicate that the UE needs to be handed over from a first network to a second network; and a sending unit 730 configured to send, according to the first information received by the receiving unit 710, a second message including the first information, so that a target gateway device allocates, to the UE according to at least the first information, a second IP address that is the same as a first IP address and used when a second PDN connection is established by using the second network and the target gateway device, where the first IP address is an IP address used when the UE establishes a first PDN connection by using the first network and the target gateway device.

The UE may access the first network, and establish a PDN connection (including a first PDN connection) by using an EPC target gateway device (hereinafter referred to as a PDN-GW) connected to the first network and second network. In addition, the PDN-GW allocates an IP address corresponding to the PDN connection to the UE, and the UE may use all IP addresses used in the first network as the first IP address. Alternatively, the UE may determine, from the IP addresses according to at least use of the IP addresses, an IP address (first IP address) that the UE expects to continue to use after the UE is handed over to the second network. For example, if an IP address is being used before a network handover, and a service corresponding to the IP address does not end during the handover, the UE may determine to expect to use the IP address after the UE is handed over to the second network and continue, by using a PDN-GW providing the IP address, the service corresponding to the IP address.

Optionally, the first network includes a 3GPP network.

Optionally, the second network includes a TWAN.

Optionally, the apparatus 700 further includes a processing unit 720 configured to obtain user data of the UE, where the user data includes a mapping relationship between a PDN connection established by the UE by using the first network and a gateway device providing the PDN connection; and the sending unit 730 is further configured to send a second message including the first information according to at least the user data under control of the processing unit.

Optionally, the first information includes first IP address information indicating the first IP address, and the processing unit 720 is further configured to extract the first IP address from the first IP address information; and configured to determine the target gateway device according to at least the first IP address and the user data; and the sending unit 730 is further configured to send the second message to the target gateway device.

Optionally, the first information includes a handover indication identifier indicating that the UE requests to be handed over from the first network to the second network, and the sending unit 730 is further configured to send a second message including the first information to the gateway device including the target gateway device.

Optionally, the first information includes the handover indication identifier; the number of PDN connections established by the UE by using the first network and including the first PDN connection is at least two; the first information further includes a first distinct identifier used to indicate the first PDN connection; and the processing unit 720 is further configured to determine the first PDN connection according to at least the first distinct identifier; and configured to determine the target gateway device according to at least the first PDN connection and the user data; and the sending unit 730 is further configured to send a second message including the first information to the target gateway device; or the sending unit 730 is further configured to send a second message including the first information to the gateway device including the target gateway device.

The TWAN may receive a GAS-ANQP query message or a DHCPV4 Request message sent by the UE, where the message carries, for example, 3GPP cellular network information, and the information includes a network handover identifier (Handover indication), indicating to the TWAN that the access is a handover and that the IP address needs to be reserved (the following describes a process of determining a first IP address by the TWAN (specifically, a TWAP) according to the Handover indication). Alternatively, the UE may send a GAS-ANQP query message or a DHCPV4 Request message, which carries, for example, information about a requested IP address, where the information about the requested IP address indicates that the UE expects to obtain the first IP address. The TWAN may directly extract the first IP address from the information about the requested IP address. Alternatively, the UE may send a GAS-ANQP query message or a DHCPV4 Request message, which carries, for example, both a Handover indication and information about a requested IP address. If a user establishes multiple PDN connections (the number of IP addresses used for establishing the PDN connections is the same as the number of the PDN connections) by using the 3GPP (an example of the first network), and a part of PDN connections need to be handed over but the other PDN connections do not need to be handed over, the UE may perform distinction by carrying a Bearer ID or an APN in a GAS-ANQP query message, where the Bearer ID is used to indicate a PDN connection, and the APN may indicate more than two PDN connections. For example, the IP address used by a PDN connection corresponding to the Bearer ID or APN may be used as the first IP address, indicating to the TWAN and PDN-GW that the UE expects to reserve the IP address of the PDN connection corresponding to the Bearer ID or APN, that is, the IP address of the PDN connection corresponding to the Bearer ID or APN is the first IP address. It should be understood that the illustrated method for indicating the first IP address is only an exemplary description of the present invention and that the present invention is not limited thereto. For example, an IP address used by a PDN connection not corresponding to the Bearer ID may also be used as the first IP address or a distinct identifier may also not be carried, indicating that the UE expects to hand over all PDN connections established by using the 3GPP. In addition, the illustrated messages, information elements, and identifiers are only exemplary descriptions of the present invention, and the present invention is not limited thereto. Other messages, information elements, and identifiers that can enable the PDN-GW and the like to know the IP address that the UE expects to reserve all fall within the protection scope of the present invention.

If the first information sent by the UE includes a handover indication identifier indicating that the UE requests to be handed over from the 3GPP to the TWAN, the TWAG may determine that all IP addresses used when the UE establishes PDN connections by using the 3GPP need to be reserved, and therefore, may select PDN-GW addresses obtained from the TWAP and corresponding to all PDN connections.

If the first information sent by the UE includes a handover indication identifier indicating that the UE requests to be handed over from the 3GPP to the TWAN and a first distinct identifier corresponding to the first IP address, the TWAG may determine, from all IP addresses used when the UE establishes PDN connections by using the 3GPP, an IP address corresponding to the first distinct identifier, as the first IP address, and therefore may select a PDN-GW address obtained from the TWAP and providing a PDN connection corresponding to the first IP address.

In addition, the TWAG (second network) may send, for example, a Create Session Request message to the PDN-GW according to the selected PDN-GW address, where the message carries the first information. It should be understood that the Create Session Request message (second message) is only an exemplary description of the present invention and that the present invention is not limited thereto.

Optionally, the processing unit 720 is further configured to determine, before receiving the first message, that a fourth message that is sent by the UE and used for obtaining the second IP address is not received; the receiving unit 710 is further configured to receive a sixth message sent by the target gateway device, where the sixth message includes second information used to indicate the second IP address; and the sending unit 730 is further configured to send a fifth message to the UE, where the fifth message includes the second information used to indicate the second IP address.

The apparatus 700 for network handover according to the embodiment of the present invention may correspond to the second network (TWAN) in the method according to the embodiment of the present invention. In addition, the units in the apparatus 700 for network handover, namely, modules, and other operations and/or functions above respectively implement the corresponding procedures in the method 400 in FIG. 4. Details are not repeated herein for brevity.

By using the apparatus for network handover according to the embodiment of the present invention, when a UE is handed over from a first network to a second network, a gateway device obtains a first IP address used when the UE establishes a PDN connection by using the first network, and allocates, to the UE, a second IP address that is the same as the first IP address and used when a PDN connection is established by using the second network. Therefore, service continuity is ensured after a network handover.

Figure 8:
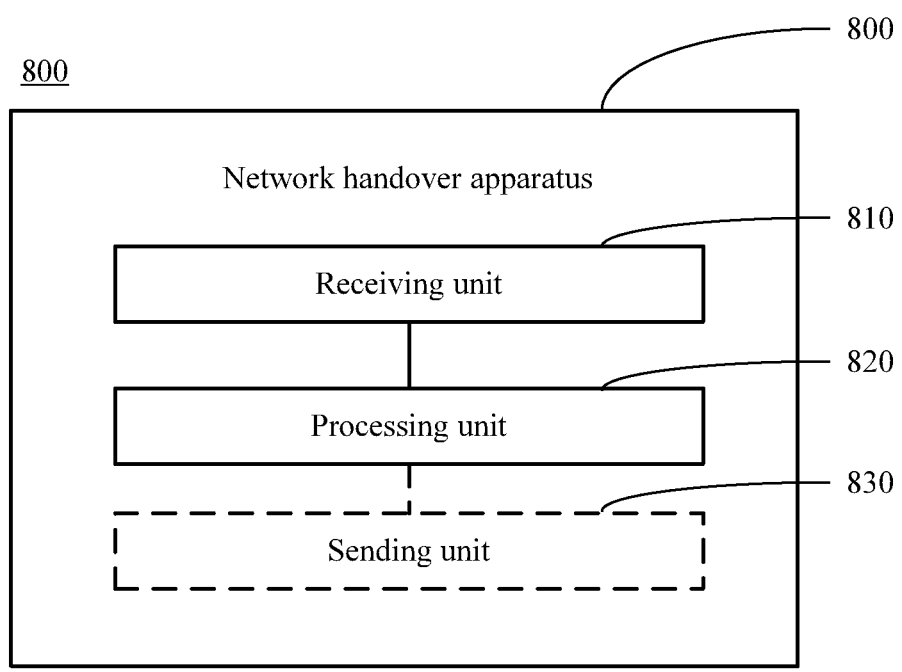
FIG. 8 is a schematic block diagram of an apparatus for network handover according to another embodiment of the present invention.

FIG. 8 is a schematic block diagram of an apparatus 800 for network handover according to an embodiment of the present invention. As shown in FIG. 8, the apparatus 800 includes a receiving unit 810 configured to receive a second message that is sent by a second network and includes first information, where the second message is sent by the second network according to at least a first message that is sent by a UE and includes the first information, and the first information is used to indicate a first IP address used when the UE establishes a first PDN connection by using the first network; and a processing unit 820 configured to determine the first IP address according to at least the first information; and configured to allocate a second IP address that is the same as the first IP address to the UE when the UE establishes a PDN connection by using the second network.

The UE may access the first network, and establish a PDN connection (including a first PDN connection) by using an EPC target gateway device (hereinafter referred to as a PDN-GW) connected to the first network and second network. In addition, the PDN-GW allocates an IP address corresponding to the PDN connection to the UE, and the UE may use all IP addresses used in the first network as the first IP address. Alternatively, the UE may determine, from the IP addresses according to use of the IP addresses, an IP address (first IP address) that the UE expects to continue to use after the UE is handed over to the second network. For example, if an IP address is being used before a network handover, and a service corresponding to the IP address does not end during the handover, the UE may determine to expect to use the IP address after the UE is handed over to the second network and continue, by using the PDN-GW providing the IP address, the service corresponding to the IP address.

Optionally, the first network includes a 3GPP network.

Optionally, the second network includes a TWAN.

Optionally, the first information includes first IP address information indicating the first IP address, and the processing unit 820 is configured to extract the first IP address from the first IP address information.

Optionally, the first information includes a handover indication identifier, and the processing unit 820 is configured to determine, according to at least the handover indication identifier, an IP address used when the UE establishes a PDN connection by using the first network, as the first IP address.

Optionally, the first information includes the handover indication identifier; the number of PDN connections established by the UE by using the first network and including the first PDN connection is at least two; the first information further includes a first distinct identifier used to indicate the first PDN connection; and the processing unit 820 is configured to determine the first PDN connection according to at least the first distinct identifier; and configured to determine the IP address of the first PDN connection as the first IP address according to the handover indication identifier.

The TWAN may receive a GAS-ANQP query message or a DHCPV4 Request message sent by the UE, where the message carries, for example, 3GPP cellular network information, and the information includes a network handover identifier (Handover indication), indicating to the TWAN that the access is a handover and that the IP address needs to be reserved (the following describes a process of determining a first IP address by the TWAN (specifically, a TWAP) according to the Handover indication). Alternatively, the UE may send a GAS-ANQP query message or a DHCPV4 Request message, which carries, for example, information about a requested IP address, where the information about the requested IP address indicates that the UE expects to obtain the first IP address. The TWAN may directly extract the first IP address from the information about the requested IP address. Alternatively, the UE may send a GAS-ANQP query message or a DHCPV4 Request message, which carries, for example, both a Handover indication and information about a requested IP address. If a user establishes multiple PDN connections (the number of IP addresses used for establishing the PDN connections is the same as the number of the PDN connections) by using the 3GPP (an example of the first network), and a part of PDN connections need to be handed over but the other PDN connections do not need to be handed over, the UE may perform distinction by carrying a Bearer ID or an APN in a GAS-ANQP query message, where the Bearer ID is used to indicate a PDN connection, and the APN may indicate more than two PDN connections. For example, the IP address used by a PDN connection corresponding to the Bearer ID or APN may be used as the first IP address, indicating to the TWAN and PDN-GW that the UE expects to reserve the IP address of the PDN connection corresponding to the Bearer ID or APN, that is, the IP address of the PDN connection corresponding to the Bearer ID or APN is the first IP address. It should be understood that the illustrated method for indicating the first IP address is only an exemplary description of the present invention and that the present invention is not limited thereto. For example, an IP address used by a PDN connection not corresponding to the Bearer ID may also be used as the first IP address or a distinct identifier may also not be carried, indicating that the UE expects to hand over all PDN connections established by using the 3GPP. In addition, the illustrated messages, information elements, and identifiers are only exemplary descriptions of the present invention, and the present invention is not limited thereto. Other messages, information elements, and identifiers that can enable the PDN-GW and on the like to know the IP address that the UE expects to reserve all fall within the protection scope of the present invention.

If the first information sent by the UE includes a handover indication identifier indicating that the UE requests to be handed over from the 3GPP to the TWAN, the TWAG may determine that all IP addresses used when the UE establishes PDN connections by using the 3GPP need to be reserved, and therefore, may select PDN-GW addresses obtained from the TWAP and corresponding to all PDN connections.

If the first information sent by the UE includes a handover indication identifier indicating that the UE requests to be handed over from the 3GPP to the TWAN and a first distinct identifier corresponding to the first IP address, the TWAG may determine, from all IP addresses used when the UE establishes PDN connections by using the 3GPP, an IP address corresponding to the first distinct identifier, as the first IP address, and therefore may select a PDN-GW address obtained from the TWAP and providing a PDN connection corresponding to the first IP address.

In addition, the TWAG (second network) may send, for example, a Create Session Request message to the PDN-GW according to the selected PDN-GW address, where the message carries the first information. It should be understood that the Create Session Request message (second message) is only an exemplary description of the present invention and that the present invention is not limited thereto.

If the first information includes first IP address information indicating the first IP address, the PDN-GW may extract the first IP address from the first IP address information. Thus, when the UE establishes a PDN connection by using the TWAN, the UE may use the first IP address as an IP address (second IP address) when the UE establishes a PDN connection by using the TWAN.

If the first information includes a handover indication identifier indicating that the UE requests to be handed over from the first network to the second network, the PDN-GW may detect, according to the user information carried in the Create Session Request and indicating the UE, an IP address (first IP address) provided for the UE when the UE establishes a PDN connection by using the 3GPP network, and use the IP address as an IP address (second IP address) when the UE establishes a PDN connection by using the TWAN.

If the first information includes a handover indication identifier indicating that the UE requests to be handed over from the first network to the second network and a first distinct identifier corresponding to the first IP address, the PDN-GW may detect, according to the user information carried in the Create Session Request and indicating the UE, IP addresses provided for the UE when the UE establishes PDN connections by using the 3GPP network, select, from the IP addresses, an IP address corresponding to the first distinct identifier, and use the IP address as an IP address (second IP address) when the UE establishes a PDN connection by using the TWAN.

In addition, the PDN-GW may send, for example, a Create Session Response message to the TWAN, where the message carries second information indicating the second IP address. It should be understood that the Create Session Response message is only an exemplary description of the present invention and that the present invention is not limited thereto.

Optionally, the apparatus 800 further includes a sending unit 830 configured to send a sixth message to the second network, where the sixth message includes second information used to indicate the second IP address; and optionally, the second information includes second IP address information indicating the second IP address and/or a handover response identifier indicating that the UE is successfully handed over from the first network to the second network.

Optionally, the second information includes the handover response identifier; the number of first PDN connections including an available first PDN connection is at least two, where an IP address of the available first PDN connection is the same as the second IP address; and the second information further includes a second distinct identifier used to indicate the available first PDN connection.

The apparatus 800 for network handover according to the embodiment of the present invention may correspond to the gateway device (PDN-GW) in the method according to the embodiment of the present invention. In addition, the units in the apparatus 800 for network handover, namely, modules, and other operations and/or functions above respectively implement the corresponding procedures in the method 500 in FIG. 5. Details are not repeated herein for brevity.

By using the apparatus for network handover according to the embodiment of the present invention, when a UE is handed over from a first network to a second network, a gateway device obtains a first IP address used when the UE establishes a PDN connection by using the first network, and allocates, to the UE, a second IP address that is the same as the first IP address and used when a PDN connection is established by using the second network. Therefore, service continuity is ensured after a network handover.

It should be understood that the term "and/or" in the specification is only to describe an association relationship of associated objects, and represents that three relationships may exist, for example, A and/or B may represent the following three cases: A exists alone, both A and B exist, and B exists alone. In addition, the character "/" in the specification usually represents that the former and latter objects associated are in an "or" relationship.

It should be understood that in the embodiments of the present invention, the sequence numbers in each process do not represent an execution sequence; the execution sequence of each process should be determined by the function and internal logic of the process, and shall not be construed as a limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes any medium that can store program code, such as a universal serial bus (USB) flash drive, a removable hard disk, a read-only memory (ROM), a random access memory (RAM), a magnetic disc, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, implemented by user equipment (UE), for requesting handover of the UE's access to an evolved packet core (EPC) from a first network to a second network, the method comprising:

sending a first message to the second network, wherein the UE has a first packet data network (PDN) connection to the EPC using the first network, wherein the UE uses a first Internet Protocol (IP) address for the first PDN connection, and wherein the first message comprises a request to hand over access from the first network to the second network; and receiving a second message from the second network, wherein the second message comprises an indication that the UE has been successfully handed over from the first network to the second network, wherein the UE has a second PDN connection to the EPC using the second network after receipt of the second message, wherein the UE uses a second IP address for the second PDN connection, and wherein the first IP address and the second IP address are the same.

2. The method according to claim 1, wherein before sending the first message, the method further comprises determining that the second network is routable to EPC.

3. The method according to claim 1, wherein the UE has a plurality of PDN connections to the EPC using the first network, and wherein the first message further comprises a first distinct identifier used to indicate the first PDN connection.

4. The method according to claim 1, wherein the method further comprises determining the second IP address according to at least the second message.

5. A method, implemented by a trusted wireless access gateway (TWAG) on a second network, for network handover of a piece of user equipment's (UE's) access to an evolved packet core (EPC) from a first network to the second network, the method comprising:

receiving a first message that is sent by the UE, wherein the UE has a first data packet network (PDN) connection to the EPC using the first network, wherein the UE uses a first Internet Protocol (IP) address for the first PDN connection, and wherein the first message comprises a request to hand over access from the first network to the second network; and sending a second message to a target gateway device to request the target gateway device to allocate a second IP address to the UE, wherein the second IP address is the same as the first IP address, and wherein the second IP address is used when a second packet data network (PDN) connection is established between the UE and the EPC by using the second network and the target gateway device.

6. The method according to claim 5, wherein the UE has a plurality of PDN connections to the EPC using the first network, wherein the first message further comprises a first distinct identifier used to indicate the first PDN connection, and wherein sending the second message comprises;

determining the target gateway device according to at least the first distinct identifier; and sending the second message to the target gateway device.

7. A method, implemented by a packet data network gateway (PDN-GW), for network handover of a piece of user equipment's (UE's) access to an evolved packet core (EPC) from a first network to a second network, the method comprising:

receiving a first message that is sent by a trusted wireless access gateway (TWAG) on the second network and comprises first information, wherein the first information is sent by the TWAG according to at least the first information sent by the UE, and wherein the first information is used to indicate that the UE should be handed over from the first network to the second network;

determining a first Internet Protocol (IP) address according to at least the first information, wherein the first IP address is an IP address used when the UE establishes a first packet data network (PDN) connection by using the first network and the PDN-GW; and allocating a second IP address that is as same as the first IP address to the UE when the UE establishes a second PDN connection by using the second network.

8. The method according to claim 7, wherein the first information comprises a handover indication, and wherein determining the first IP address comprises determining the first IP address according to at least the handover indication.

9. The method according to claim 8, wherein the UE has a plurality of PDN connections to the EPC using the first network, wherein the first information further comprises a first distinct identifier used to indicate the first PDN connection, and wherein determining the first IP address according to at least the first information comprises:

determining the first PDN connection according to at least the first distinct identifier; and determining the IP address of the first PDN connection as the first IP address according to at least the handover indication.

10. The method according to claim 8, wherein the first network comprises a 3rd Generation Partnership Project (3GPP) network.

11. The method according to claim 10, wherein the second network comprises a trusted wireless local area network access network (TWAN).

12. User equipment (UE), configured to have a first packet data network (PDN) connection to an evolved packet core (EPC) from a first network using a first Internet Protocol (IP) address, the UE comprising:

a transmitter configured to send a first message to a second network, wherein the first message comprises a request to hand over access from the first network to the second network; and a receiver coupled to the transmitter and configured to receive a second message from the second network, wherein the second message comprises an indication that the UE has been successfully handed over from the first network to the second network, therein the UE has a second PDN connection to the EPC using the second network after receipt of the second message, wherein the UE uses a second IP address for the second PDN connection, and wherein the first IP address and the second IP address are the same.

13. The UE according to claim 12, further comprising a processor, coupled to the receiver and transmitter, wherein the processor is configured to determine that the second network is routable to the EPC.

14. The UE according to claim 13, wherein the second message comprises an indication of the second IP address, and wherein the processor is further configured to determine the second IP address according to at least the second message.

15. The UE according to claim 12, wherein the UE has a plurality of PDN connections to the EPC using the first network, and wherein the first message further comprises a first distinct identifier used to indicate the first PDN connection.

16. A trusted wireless access gateway (TWAG) on a second network, the TWAG comprising:

a receiver configured to receive a first message that is sent by a user equipment (UE), wherein the UE has a first data packet network (PDN) connection to an evolved packet core (EPC) using a first network, wherein the UE uses a first Internet Protocol (IP) address for the first PDN connection, and wherein the first message comprises a request to hand over access from the first network to the second network; and a transmitter coupled to the receiver and configured to send a second message to a target gateway device to request the target gateway device to allocate a second IP address to the UE, wherein the second IP address is the same as the first IP address, and wherein the second IP address is used when a second packet data network (PDN) connection is established between the UE and the EPC using the second network and the target gateway device.

17. The TWAG according to claim 16, wherein the UE has a plurality of PDN connections to the EPC using the first network, wherein the first message further comprises a first distinct identifier used to indicate the first PDN connection, and wherein the TWAG further comprises a processor configured to:

determine the first PDN connection according to at least the first distinct identifier; and determine the target gateway device according to the first PDN connection.

18. A packet data network gateway (PDN-GW), the PDN-GW comprising:

a receiver configured to receive a first message that is sent by a trusted wireless access gateway (TWAG) on a second network, wherein the first message is used to indicate that a user equipment (UE) should be handed over from a first network to the second network; and a processor coupled to the receiver and configured to determine a first Internet Protocol (IP) address according to the first message, wherein the first IP address is an IP address used by the UE to access an evolved packet core (EPC) from a first PDN connection using the first network, and configured to allocate a second IP address that is as same as the first IP address to the UE when the UE establishes a second PDN connection by using the second network.

19. The PDN-GW according to claim 18, wherein the first network comprises a 3rd Generation Partnership Project (3GPP) network, and wherein the second network comprises a trusted wireless local area network access network (TWAN).

20. The PDN-GW according to claim 18, wherein the UE has a plurality of PDN connections to the EPC using the first network, wherein the first message further comprises a first distinct identifier used to indicate the first PDN connection, and wherein the processor is further configured to:

determine the first PDN connection according to at least the first distinct identifier; and determine the IP address of the first PDN connection as the first IP address according to the first message.

\* \* \* \* \*